United States Patent
Togita

(10) Patent No.: US 10,491,854 B2
(45) Date of Patent: Nov. 26, 2019

(54) IMAGE CAPTURING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Koji Togita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/810,795

(22) Filed: Nov. 13, 2017

(65) Prior Publication Data
US 2018/0139407 A1 May 17, 2018

(30) Foreign Application Priority Data

Nov. 14, 2016 (JP) .................................. 2016-221833

(51) Int. Cl.
| | | |
|---|---|---|
| *H04N 5/919* | (2006.01) | |
| *H04N 5/77* | (2006.01) | |
| *H04N 9/804* | (2006.01) | |
| *H04N 19/146* | (2014.01) | |
| *H04N 19/174* | (2014.01) | |
| *H04N 19/124* | (2014.01) | |
| *H04N 5/232* | (2006.01) | |
| *H04N 19/126* | (2014.01) | |

(52) U.S. Cl.
CPC ......... *H04N 5/919* (2013.01); *H04N 5/23245* (2013.01); *H04N 5/77* (2013.01); *H04N 5/772* (2013.01); *H04N 9/8042* (2013.01); *H04N 19/124* (2014.11); *H04N 19/146* (2014.11); *H04N 19/174* (2014.11); *H04N 19/126* (2014.11)

(58) Field of Classification Search
None
See application file for complete search history.

(56) References Cited

U.S. PATENT DOCUMENTS

| 9,462,182 B2* | 10/2016 | Togita | H04N 5/772 |
| 2003/0118240 A1* | 6/2003 | Satoh | H04N 19/176 |
| | | | 382/239 |
| 2010/0119157 A1* | 5/2010 | Kameyama | H04N 19/115 |
| | | | 382/195 |

(Continued)

FOREIGN PATENT DOCUMENTS

JP 2007-097145 A 4/2007

*Primary Examiner* — James M Hannett
(74) *Attorney, Agent, or Firm* — Carter, DeLuca & Farrell LLP

(57) ABSTRACT

An image capturing apparatus that continuously generates and records a sequence of RAW images, the image capturing apparatus comprising, an image capturing unit configured to generate a RAW image by shooting a subject, an encoding unit configured to generate encoded data by encoding the RAW image, and a recording/reproduction unit configured to record the encoded data in a recording medium and read out the encoded data from the recording medium, wherein the encoding unit includes a quantization unit configured to, when the sequence of RAW images are continuously generated, perform quantization while changing a quantization parameter within the same RAW image.

21 Claims, 14 Drawing Sheets

(56) References Cited

U.S. PATENT DOCUMENTS

| | | | |
|---|---|---|---|
| 2011/0243470 A1* | 10/2011 | Noguchi | H04N 19/176 382/239 |
| 2012/0032960 A1* | 2/2012 | Kameyama | H04N 7/17318 345/428 |
| 2015/0034643 A1* | 2/2015 | Wiening | B32B 7/06 220/258.2 |
| 2018/0152700 A1 | 5/2018 | Togita | |

* cited by examiner

BAYER ARRAY

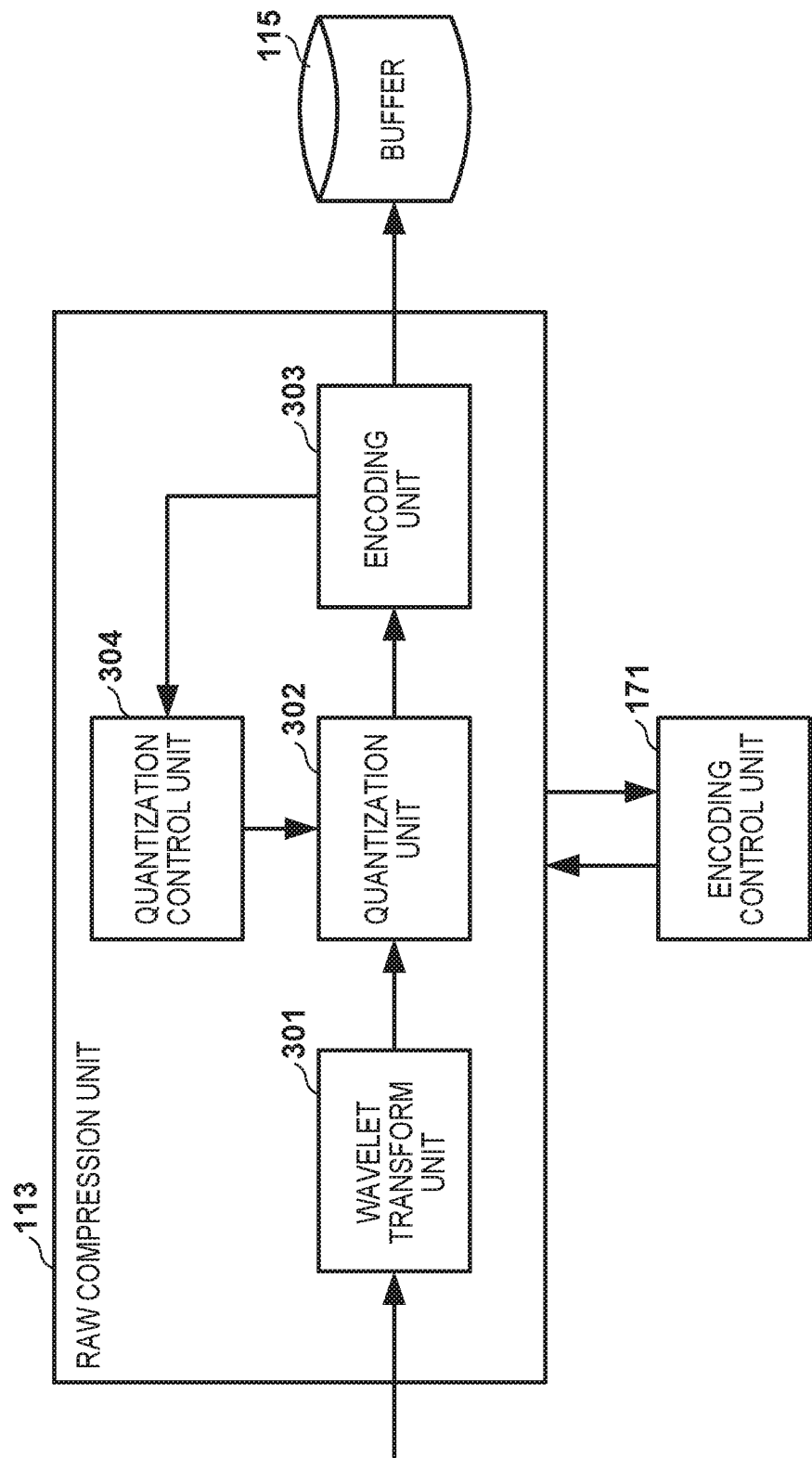

IMAGE CAPTURING APPARATUS, IMAGE PROCESSING METHOD, AND NON-TRANSITORY COMPUTER-READABLE STORAGE MEDIUM

BACKGROUND OF THE INVENTION

Field of the Invention

The invention relates to an image capturing apparatus, an image processing method, and a non-transitory computer-readable storage medium.

Description of the Related Art

Image capturing units can execute so-called development processing that, for example, converts a raw image (RAW image) shot by an image sensor into signals composed of luminance and chrominance by applying de-Bayer processing (demosaicing processing) to the raw image, removes noise from the signals, corrects optical distortion, and optimizes the image. The luminance signals and chrominance signals that have undergone such development processing are generally recorded in a recording medium in a compressed and encoded state.

There are also image capturing apparatuses that can record RAW images. Although an enormous amount of data is needed to record RAW images, advanced users use the RAW images by preference as the RAW images have the advantage of minimizing correction to and deterioration of original images and being editable after shooting.

Such RAW images can be recorded not only as still images, but also as moving images. In recording RAW moving images, it is necessary to perform control for compressing a data amount to a desired code amount so that moving images of a certain period can be recorded in a predetermined recording medium. However, when the data amount exceeds the speed of data transfer to the predetermined recording medium due to a failure to appropriately perform code amount control and quantization control, data corruption occurs in the recording medium. In the case of recording of still images, there is no notion of guarantee on real-time reproduction; on the other hand, in the case of recording of moving images, proper reproduction cannot be performed on a reproduction apparatus when a bitrate of the moving images exceeds a bitrate that guarantees real-time reproduction, even if the moving images have been written to the recording medium. To prevent the occurrence of these problems, image capturing apparatuses need to perform the code amount control and the quantization control appropriately.

Furthermore, a data amount could possibly exceed the speed of data transfer to a predetermined recording medium not only during recording of moving images, but also during continuous shooting and recording of still images. Japanese Patent Laid-Open No. 2007-97145 suggests an image capturing apparatus that continuously shoots and records two types of still images, that is to say, RAW still images and still images that are obtained by developing the RAW images and compressing and encoding the developed RAW images using a compression technique (e.g., JPEG and the like); this image capturing apparatus performs quantization control with respect to the still images that have been compressed and encoded.

According to the image capturing apparatus suggested by Japanese Patent Laid-Open No. 2007-97145, during continuous shooting and recording of still images, recording is performed using a combination of a lossless compressed RAW image using DPCM conversion and a JPEG image, and therefore quantization control for bitrate adjustment cannot be performed with respect to the lossless compressed RAW images. This gives rise to the possibility that a data amount exceeds the speed of data transfer to a predetermined recording medium.

SUMMARY OF THE INVENTION

In view of the above issue, the invention provides a technique to avoid problems that occur during recording and reproduction of data by controlling a data amount of RAW images through execution of quantization control during recording of the RAW images.

One aspect of embodiments of the invention relates to an image capturing apparatus that continuously generates and records a sequence of RAW images, the image capturing apparatus comprising, an image capturing unit configured to generate a RAW image by shooting a subject, an encoding unit configured to generate encoded data by encoding the RAW image, and a recording/reproduction unit configured to record the encoded data in a recording medium and read out the encoded data from the recording medium, wherein the encoding unit includes a quantization unit configured to, when the sequence of RAW images are continuously generated, perform quantization while changing a quantization parameter within the same RAW image.

Further features of the invention will become apparent from the following description of exemplary embodiments (with reference to the attached drawings).

BRIEF DESCRIPTION OF THE DRAWINGS

FIG. 3A is a block diagram showing an exemplary configuration of a RAW compression unit 113 according to the embodiment of the invention.

DESCRIPTION OF THE EMBODIMENTS

Figure 1:
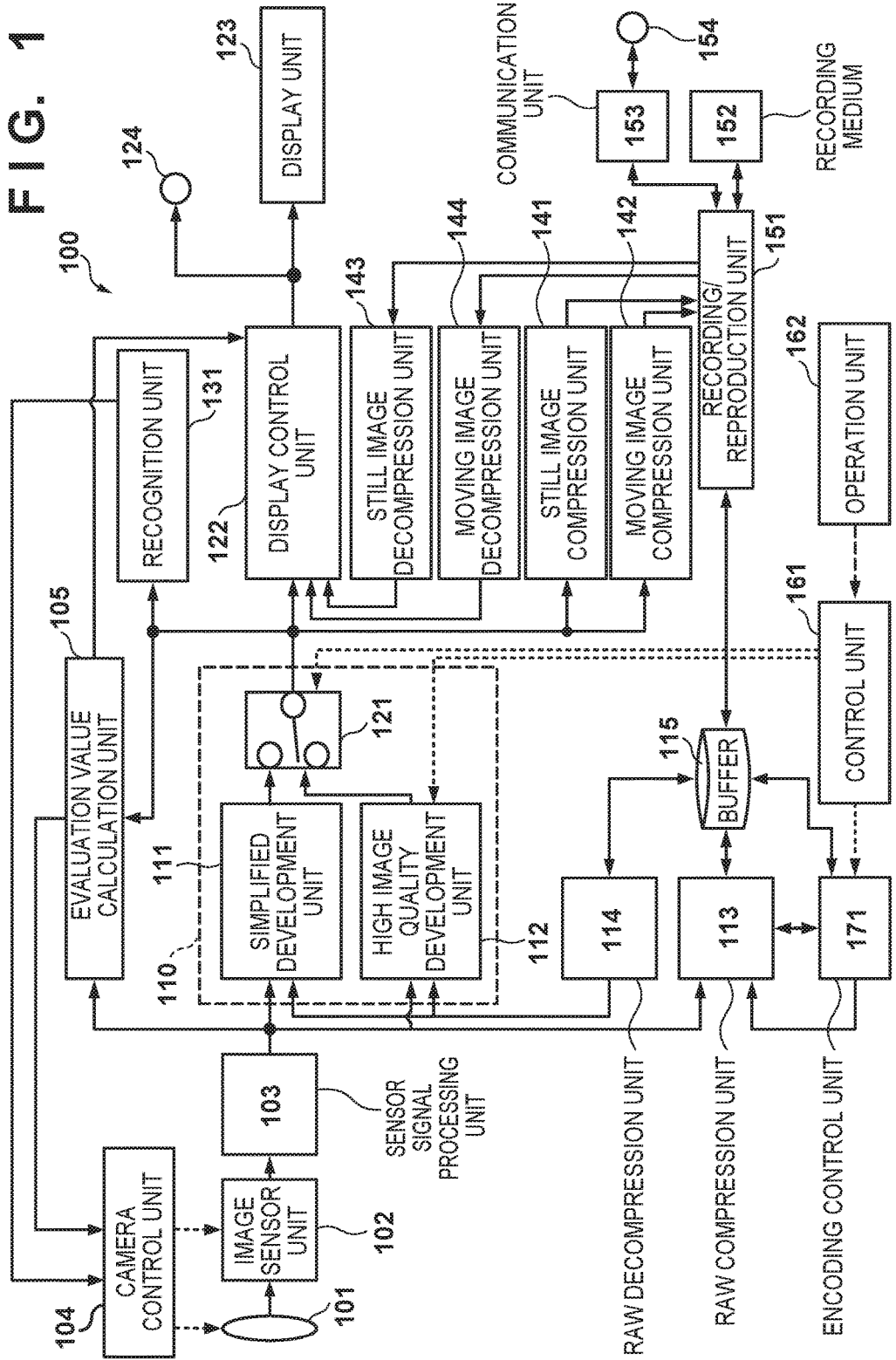
FIG. 1 is a block diagram showing an exemplary configuration of an image capturing apparatus according to an embodiment of the invention.

The following describes an embodiment of the invention with reference to the drawings. FIG. 1 is a block diagram showing an exemplary configuration of an image capturing apparatus according to the embodiment of the invention. An image capturing apparatus 100 shown in FIG. 1 can have a function of not only recording an image obtained by shooting a subject in a recording medium, but also reproducing the image from the recording medium, applying development processing to the image, displaying the developed image, and transmitting and receiving the image to and from an external apparatus or server (cloud). Therefore, an image processing apparatus, a recording apparatus, a reproduction apparatus, a recording/reproduction apparatus, a communication apparatus, and the like can be used as the image capturing apparatus according to the embodiment of the invention.

The image capturing apparatus 100 can be a digital camera, or any information processing terminal or image capturing apparatus, examples of which include a personal computer, a mobile telephone, a smartphone, a PDA, a tablet terminal, and a digital video camera. In the image capturing apparatus 100 shown in FIG. 1, each block may be configured as an image processing apparatus in the form of hardware using a dedicated logic circuit and memory, except for physical devices including an image sensor, a display element, a recording medium, an input device, and terminals. Alternatively, these image processing apparatuses may be configured in the form of software, in which case they are realized by a computer (e.g., a CPU) executing processing programs stored in a memory. In the foregoing cases, the image capturing apparatus can function as an apparatus intended to display image signals obtained by the image sensor on the display element and record the image signals in the recording medium after applying predetermined image processing to the image signals. The image capturing apparatus can also read out an image recorded in the recording medium and display the image on the display element. FIG. 1 shows a configuration including an image sensor unit 102 in consideration of a case in which the image capturing apparatus functions as a digital camera and the like. However, the embodiment of the invention may be realized with a configuration that does not include the image sensor unit 102 as an image processing apparatus that processes a RAW image.

<Configuration of Image Capturing Apparatus 100>

In FIG. 1, a control unit 161 includes a CPU and a memory that stores control programs executed by the CPU, and controls processing of the entire image capturing apparatus 100. An operation unit 162 includes keys, buttons, a touchscreen, and other input devices that are used by a user to issue an instruction to the image capturing apparatus 100. The operation unit 162 can include, for example, a shutter button. The control unit 161 detects an operation signal from the operation unit 162, and controls the operations of the blocks of the image capturing apparatus 100 so that an operation corresponding to the detected operation signal is performed. A display unit 123 is composed of, for example, a liquid crystal display (LCD), and displays an image that has been shot or reproduced by the image capturing apparatus 100, a menu screen, various types of information, and so forth.

When the operation unit 162 has issued an instruction for starting a shooting operation, an optical image of a subject to be shot is input via an image capture optical unit 101 and formed on the image sensor unit 102. During shooting, a camera control unit 104 controls the operations of the image capture optical unit 101 and the image sensor unit 102 based on the result of calculating evaluation values related to a diaphragm, focus, camera shake, and the like obtained by an evaluation value calculation unit 105, and on subject information extracted by a recognition unit 131.

Figure 2:
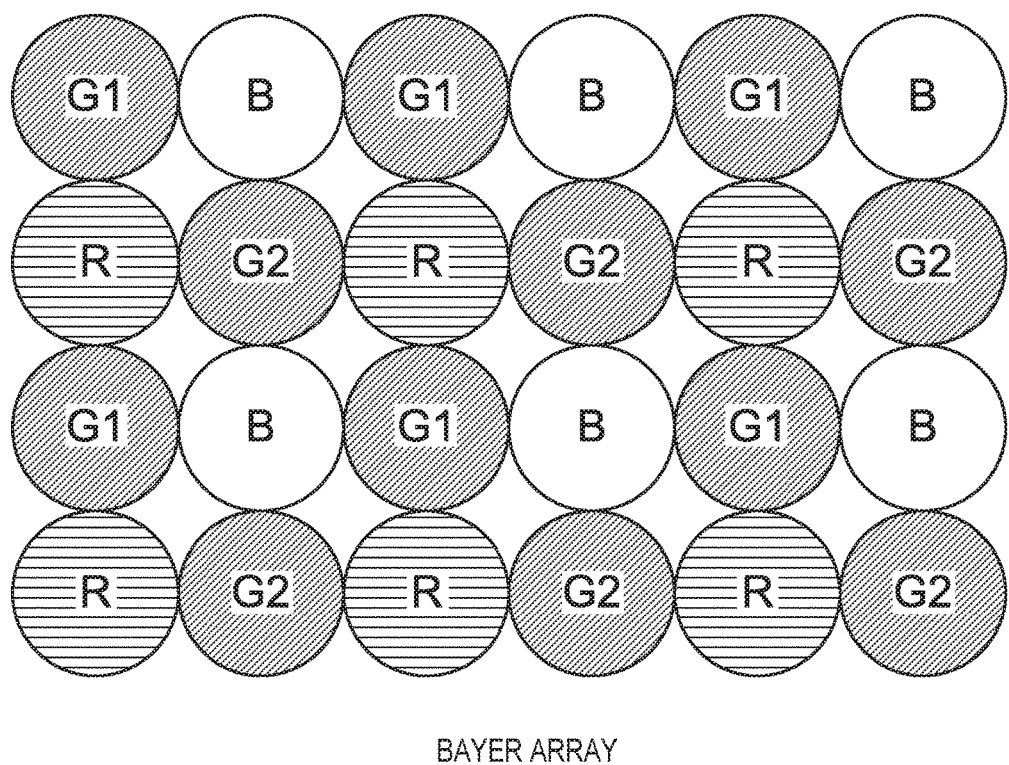
FIG. 2 shows a pixel array according to the embodiment of the invention.

The image sensor unit 102 converts light that has passed through red, green, and blue (RGB) color filters disposed on respective pixels into electrical signals, and outputs the electrical signals. FIG. 2 exemplarily shows the color filters disposed in the image sensor unit 102, together with a pixel array of an image processed by the image capturing apparatus 100. As shown in FIG. 2, red (R), green (G), and blue (B) are arranged in a mosaic in such a manner that the color filters are disposed on respective pixels; specifically, a set of one red pixel, one blue pixel, and two green pixels is provided in each group of two-by-two, or four, pixels, and such sets are arranged regularly. This pixel arrangement is generally called a Bayer array.

A sensor signal processing unit 103 applies pixel restoration processing to the electrical signals output from the image sensor unit 102. The restoration processing includes processing for applying pixel interpolation using peripheral pixel values to pixels to be restored, that is to say, values of missing pixels and pixels with low reliability in the image sensor unit 102, and processing for subtracting a predetermined offset value from such values. In the embodiment, an image output from the sensor signal processing unit 103 is expressed as a RAW image, which means an image in a raw (undeveloped) state. After the sensor signal processing unit 103 has output the RAW image, a non-illustrated encoding unit may compress and encode an amount of information of pixels of the RAW image, and then the RAW image may be supplied to a development unit 110 in a subsequent stage. In this case, the result of decoding the compressed and encoded RAW image in the development unit 110 in the subsequent stage is also referred to as the RAW image. In the embodiment, it will be assumed that the image sensor unit 102 has enough pixels to obtain a RAW image with the Bayer array having a resolution of at least 5K, and the sensor signal processing unit 103 obtains a RAW image with the Bayer array having a resolution of at least 5K.

The development unit 110, which applies development processing to the RAW image output from the sensor signal processing unit 103, can include a plurality of different development processing units. The embodiment introduces a case in which the development unit 110 includes a simplified development unit 111 as a first development unit, a high image quality development unit 112 as a second development unit, and a switch unit 121 that selects outputs from the development units. Both the simplified development unit 111 and the high image quality development unit 112 execute so-called development processing that converts the RAW image into signals composed of luminance and chrominance by applying de-Bayer processing (demosaicing processing) to the RAW image, and optimizes the image by removing noise included in the signals and correcting optical skew.

In the embodiment, the high image quality development unit 112 executes each process with higher precision than the simplified development unit 111. Although it can execute high-precision processes and hence obtain a developed image of higher image quality than the simplified development unit 111, the processing load imposed thereon is large. In view of this, the high image quality development unit 112 according to the embodiment is not specialized in performing real-time development in parallel with shooting, but can execute distributed processing over time after shooting. By thus performing the high image quality development over time after shooting rather than during shooting, an increase (peak) in circuit sizes and power consumption can be reduced. On the other hand, although the simplified development unit 111 produces a developed image of lower image quality than the high image quality development unit 112, it is configured to execute development processing that is lighter than the high image quality development so that it can execute the development processing at high speed during shooting. As the processing load imposed on the simplified development unit 111 is small, the simplified development unit 111 is used when performing real-time development in parallel with a shooting operation. The switch unit 121 performs a switching operation under control of the control unit 161 in accordance with the substance of an operation designated by the user via the operation unit 162 and control based on an operation mode that is currently effective.

Although the simplified development unit 111 and the high image quality development unit 112 are discretely provided in the development unit 110 according to the embodiment, the invention covers a configuration in which one development unit switches between operation modes and executes each of simplified development processing and high image quality development processing exclusively. The image obtained through the development processing by the development unit 110 undergoes predetermined display processing by a display control unit 122, and then displayed on the display unit 123. The image obtained through the development processing may be output from an image output terminal 124 to an externally connected display device. The image output terminal 124 includes a general-purpose interface, examples of which include HDMI® and SDI.

The image obtained through the development processing by the development unit 110 is also supplied to the evaluation value calculation unit 105. The evaluation value calculation unit 105 calculates evaluation values related to a focus state, an exposure state, and so forth from the image.

The image obtained through the development processing by the development unit 110 is also supplied to the recognition unit 131. The recognition unit 131 has a function of detecting and recognizing subject information in the image. For example, it detects a face within a screen presented by the image, and upon detection, performs operations including outputting of information indicating the position of the face, and authentication of a specific person based on characteristic information of the face and the like.

The image obtained through the development processing by the development unit 110 is also supplied to a still image compression unit 141 and a moving image compression unit 142. The still image compression unit 141 is used to compress the image as a still image. The moving image compression unit 142 is used to compress the image as a moving image. Each of the still image compression unit 141 and the moving image compression unit 142 performs high-efficiency encoding (compression encoding) of the target image to generate an image with a compressed amount of information, and converts the generated image into image data (still image data or moving image data). Still image compression can be performed in accordance with JPEG or other methods, whereas moving image compression can be performed in accordance with MPEG-2, H.264, H.265, or other methods.

A RAW compression unit 113 functions as an encoding unit that performs high-efficiency encoding of the RAW image output from the sensor signal processing unit 103 based on an instruction from an encoding control unit 171 using a technique of, for example, wavelet transform or delta encoding. It then converts the encoded RAW image into compressed RAW image data, and stores the compressed RAW image data to a buffer (temporary storage memory) 115. The buffer 115 temporarily stores encoded data serving as RAW image data for processing in a subsequent stage. For example, it can temporarily store RAW image data generated by the RAW compression unit 113 in writing the same to a recording medium 152, and temporarily store RAW image data that has been read out from the recording medium 152 in providing the same to a RAW decompression unit 114. RAW image data can be left in the buffer 115 so that it can be read out again, or may be moved to and recorded in another recording medium (deleted from the buffer 115) after it has been stored to the buffer 115.

The RAW decompression unit 114 reads out RAW image data stored in the buffer 115, and executes decompression processing for generating a RAW image by decoding compressed RAW image data. The RAW image obtained through the decompression processing by the RAW decompression unit 114 is supplied to the simplified development unit 111 and the high image quality development unit 112 in the development unit 110.

The control unit 161 notifies the encoding control unit 171 of an operation mode that is currently selected, that is to say, one of the following three operation modes: "moving images" for recording moving images, "shooting of single still image" for recording only one still image, and "continuous shooting of still images" for continuously recording still images. Based on the operation mode from the control unit 161 and on amounts of generated code of a previous picture from the RAW compression unit 113, the encoding control unit 171 performs code amount control, and configures settings related to target code amounts of a picture and quantization control with respect to the RAW compression unit 113.

A recording/reproduction unit 151 records a RAW file containing RAW image data, a still image file containing still image data, and a moving image file containing moving image data in the recording medium 152. Examples of the recording medium 152 include a built-in large-capacity memory or hard disk, a removable memory card, and the like. The recording/reproduction unit 151 can also read out the still image file, the moving image file, and the RAW file from the recording medium 152.

The recording/reproduction unit 151 can also write and read out various types of files to and from an external storage or server via a communication unit 153. Using a communication terminal 154, the communication unit 153 can access the Internet and an external device via wireless or wired communication.

When a reproduction operation has been started, the recording/reproduction unit 151 obtains a desired file from the recording medium 152 or via the communication unit 153, and reproduces the desired file. When the file to be reproduced is the RAW file, the recording/reproduction unit 151 stores RAW image data contained in the obtained RAW file to the buffer 115. When the file to be reproduced is the still image file, the recording/reproduction unit 151 supplies still image data contained in the obtained still image file to a still image decompression unit 143. When the file to be reproduced is the moving image file, the recording/reproduction unit 151 supplies moving image data contained in the obtained moving image file to a moving image decompression unit 144. The still image decompression unit 143 executes decompression processing for generating still images by decoding the still image data contained in the input still image file, and supplies the still images as reproduction images to the display control unit 122. The moving image decompression unit 144 executes decompression processing for generating moving images by decoding the moving image data contained in the input moving image file, and supplies the moving images as reproduction images to the display control unit 122.

<Configuration of RAW Compression Unit 113>

The operations of the RAW compression unit 113 will now be described with reference to FIG. 3A. FIG. 3A is a block diagram showing an exemplary configuration of the RAW compression unit 113. The RAW compression unit 113 includes a wavelet transform unit 301, a quantization unit 302, an encoding unit 303, and a quantization control unit 304. The wavelet transform unit 301 applies wavelet transform processing to a RAW image output from the sensor signal processing unit 103, and outputs a coefficient. The quantization unit 302 quantizes the coefficient obtained through the wavelet transform, and outputs the quantized coefficient to the encoding unit 303. The encoding unit 303 compresses the quantized coefficient using, for example, Golomb coding or another encoding method, and outputs encoded data serving as RAW image data to the buffer 115.

Based on an instruction from the encoding control unit 171, the quantization control unit 304 obtains information of amounts of generated code from the encoding unit 303, calculates a quantization parameter in predetermined units, and notifies the quantization unit 302 of the quantization parameter. Calculation of the quantization parameter in the quantization control unit 304 will be described later with reference to FIGS. 8A to 8C. The encoding control unit 171 receives, from the RAW compression unit 113, amounts of generated code of a previous picture that precedes a picture of a RAW image to be encoded, and sets target code amounts and quantization parameters used by the quantization control unit 304 on a picture-by-picture basis. The specifics of this setting will be described later.

<Encoding Control Unit 171: Using Three Operation Modes for Different Purposes>

Figure 3B:
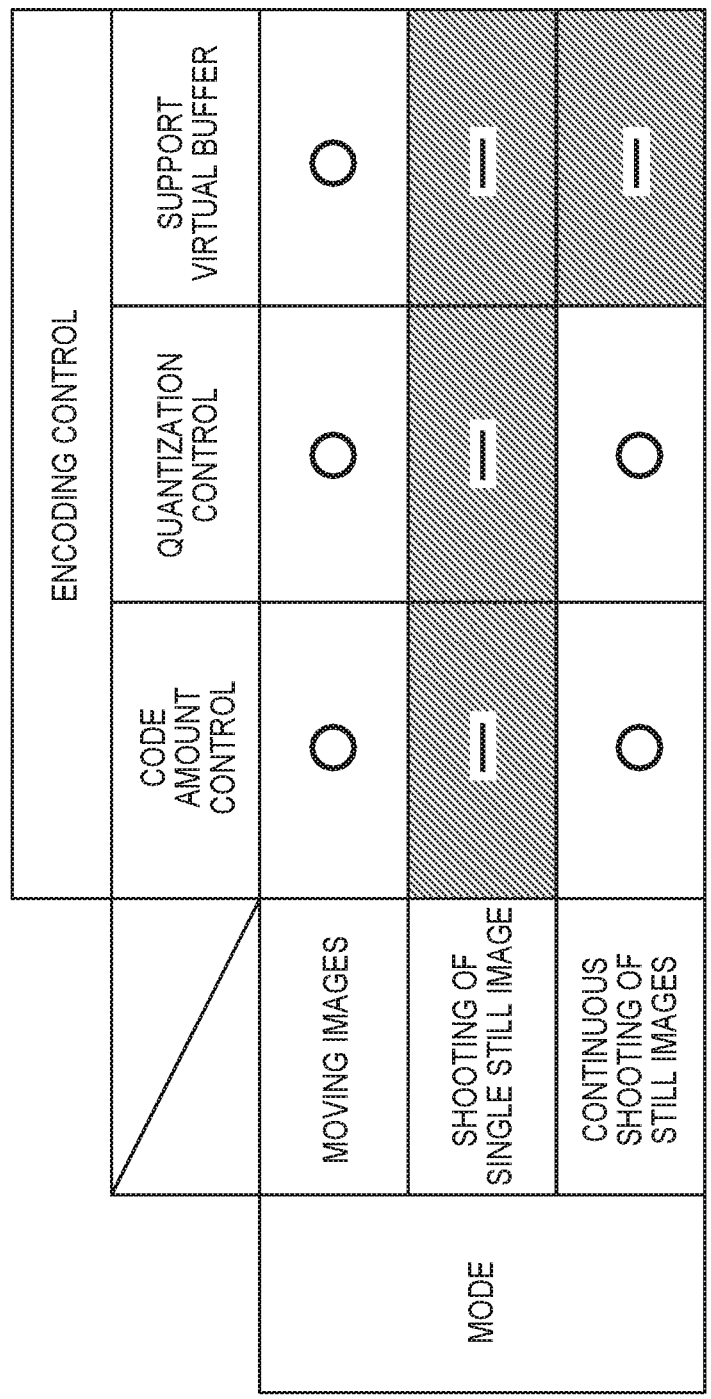
FIG. 3B shows an example of the substance of processing executed by an encoding control unit 171 according to the embodiment of the invention.

With reference to FIG. 3B, the following describes processing performed during the operation modes in which the image capturing apparatus 100 generates RAW images in the embodiment. FIG. 3B is a table showing the substances of processing of the encoding control unit 171 in different operation modes. In the embodiment, the image capturing apparatus 100 can generate RAW images in three operation modes, namely "moving images," "shooting of single still image," and "continuous shooting of still images."

First, when the current operation mode is "moving images," the encoding control unit 171 sets target code amounts on a picture-by-picture basis with respect to the RAW compression unit 113, and enables the quantization control unit 304 to perform quantization parameter control within a screen (within the same RAW image). Furthermore, the code amount control is performed in consideration of a virtual buffer that is intended to guarantee real-time reproduction. The specifics of the virtual buffer will be described later.

When the current operation mode is "shooting of single still image," target code amounts are not set on a picture-by-picture basis with respect to the RAW compression unit 113, and the quantization control unit 304 is disabled. In this operation mode, as the RAW compression unit 113 generates RAW image data at low speed, the buffer 115 does not crash even if the code amount control is not performed. Therefore, by disabling the quantization control unit 304, image quality can be prioritized over the code amount control.

When the current operation mode is "continuous shooting of still images," target code amounts of a picture is set with respect to the RAW compression unit 113, and the quantization control unit 304 is enabled. Unlike the "moving images" mode, there is no need to perform the code amount control in consideration of the virtual buffer that is intended to guarantee real-time reproduction.

As described above, in the embodiment, target code amounts are set on a picture-by-picture basis and the code amount control and the quantization control are performed in each of the operation modes that continuously generate and record a sequence of RAW images, that is to say, in each of the "moving images" mode and the "continuous shooting of still images" mode. Below, the specifics of the code amount control and the quantization control in each of the operation modes, namely "moving images," "shooting of single still image," and "continuous shooting of still images" will be described.

<Operations During "Shooting of Single Still Image" Mode>

Figure 4A:
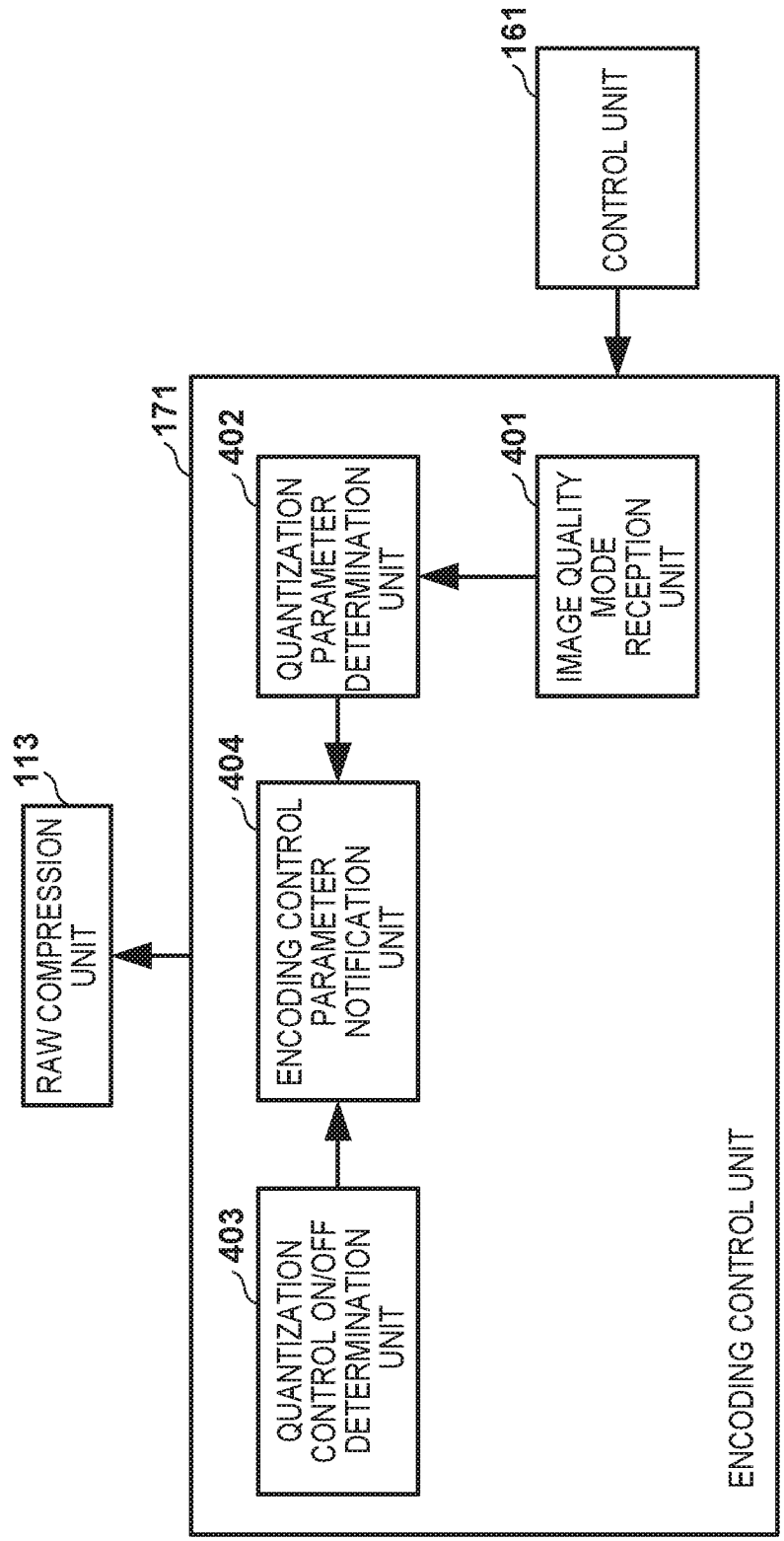
FIG. 4A is a block diagram showing an exemplary configuration of the encoding control unit 171 during a "shooting of single still image" mode according to the embodiment of the invention.

First, the operations of the image capturing apparatus 100 during the "shooting of single still image" mode will be described. FIG. 4A is a block diagram showing an exemplary functional configuration of the encoding control unit 171 during the "shooting of single still image" mode. An image quality mode reception unit 401 receives an instruction related to an image quality mode from the control unit 161, and notifies a quantization parameter determination unit 402 of the instruction. The quantization parameter determination unit 402 determines a quantization parameter corresponding to the image quality mode, and notifies an encoding control parameter notification unit 404 of the quantization parameter. A quantization control ON/OFF determination unit 403 generates a signal that disables the quantization control unit 304, and outputs the signal to the encoding control parameter notification unit 404. The encoding control parameter notification unit 404 notifies the RAW compression unit 113 of the quantization parameter and the signal indicating whether the quantization control unit 304 is to be enabled or disabled.

Figure 4B:
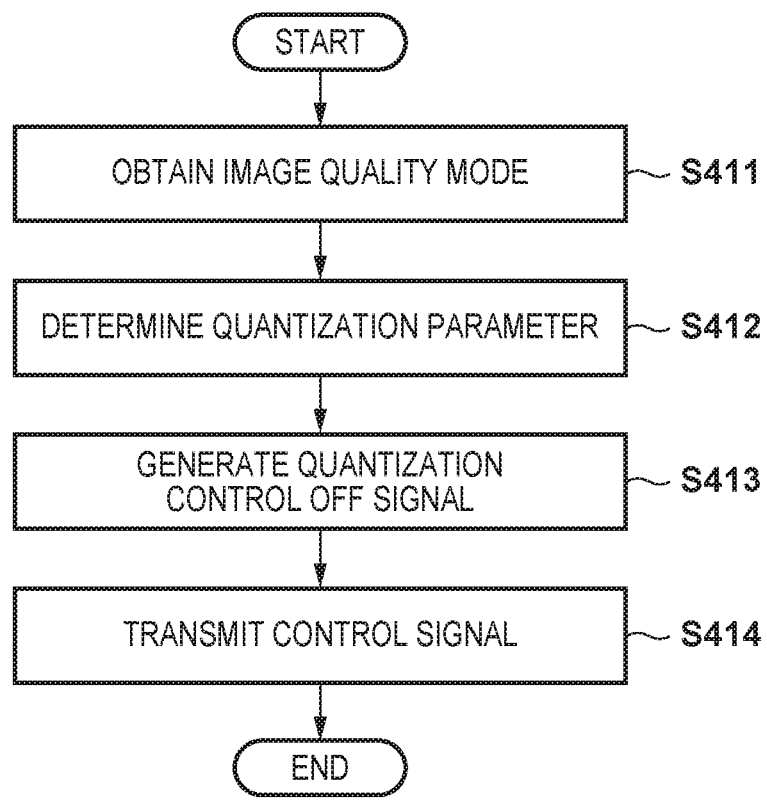
FIG. 4B is a flowchart showing an example of processing executed by the encoding control unit 171 according to the embodiment of the invention.

With reference to a flowchart of FIG. 4B, the following describes the operations of the encoding control unit 171 during the "shooting of single still image" mode. First, in step S411, the image quality mode reception unit 401 receives information that designates an image quality mode from the control unit 161. In the next step S412, the quantization parameter determination unit 402 obtains the information of the image quality mode from the image quality mode reception unit 401, and determines a quantization parameter corresponding to the image quality mode. In the next step S413, the quantization control ON/OFF determination unit 403 generates a signal that disables the quantization control unit 304 (a quantization control OFF signal). In step S414, the encoding control parameter notification unit 404 outputs a control signal to the RAW compression unit 113. This control signal contains the determined quantization parameter and the quantization control OFF signal.

The RAW compression unit 113 performs encoding in accordance with the parameter from the encoding control parameter notification unit 404. The quantization unit 302 executes quantization processing using the quantization parameter from the encoding control parameter notification unit 404. As an instruction for disabling the quantization control unit 304 has been issued, the quantization parameter used in the quantization processing is not changed within a screen.

As described above, in the "shooting of single still image" mode, the quantization control unit 304 is disabled; therefore, despite the lack of controllability of a code amount, the quantization is neither enhanced nor diminished in light of the code amount, and hence encoding is performed with a priority on the image quality.

<Operations During "Moving Images" Mode>

Figure 5:
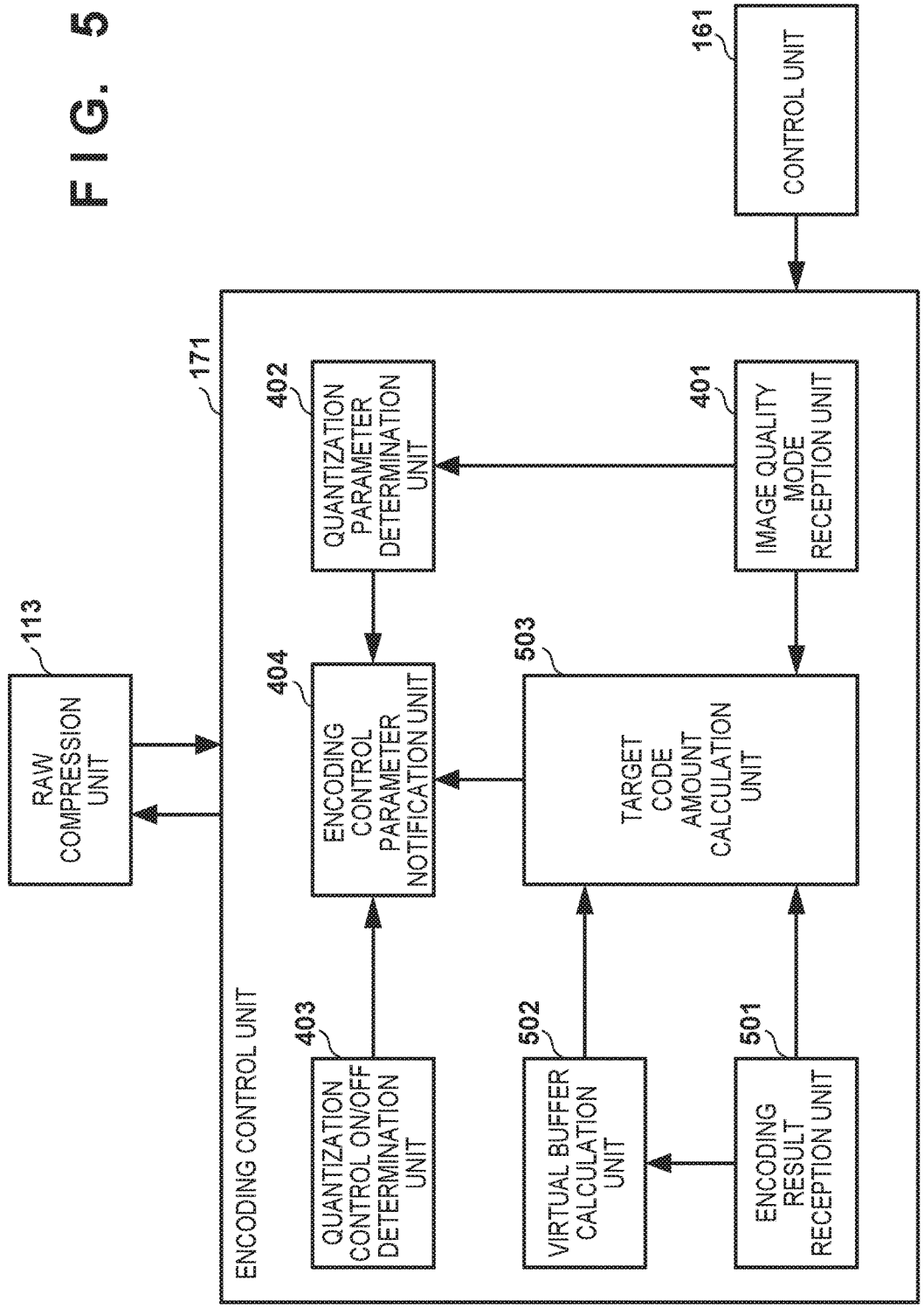
FIG. 5 is a block diagram showing an exemplary configuration of the encoding control unit 171 during a "moving images" mode according to the embodiment of the invention.

Next, the operations of the image capturing apparatus 100 during the "moving images" mode will be described. FIG. 5 is a block diagram showing an exemplary functional configuration of the encoding control unit 171 during the "moving images" mode. During the "moving images" mode, more function blocks are used in addition to the function blocks used during the "shooting of single still image" mode shown in FIG. 4A. The function blocks shown in FIG. 4A also perform operations corresponding to the "moving images" mode. Note that the function blocks that are the same as in FIG. 4A are given the same reference signs.

The image quality mode reception unit 401 receives an instruction related to an image quality mode from the control unit 161, and notifies the quantization parameter determination unit 402 and a target code amount calculation unit 503 of the instruction. The quantization parameter determination unit 402 determines a default quantization parameter corresponding to the image quality mode for the top picture, and determines a picture-by-picture quantization parameter in accordance with an encoding result for the subsequent pictures. The quantization control ON/OFF determination unit 403 generates a signal that enables the quantization control unit 304 (a quantization control ON signal), and outputs the signal to the encoding control parameter notification unit 404.

An encoding result reception unit 501 receives an encoding result of a previous picture from the RAW compression unit 113. Based on the encoding result of the previous picture, a virtual buffer calculation unit 502 updates a buffer position of the virtual buffer. The virtual buffer is intended to control encoding processing of the RAW compression unit 113 based on a virtual amount that is presumed to be stored in the buffer 115 at the time of decompression of RAW image data; the specifics of the virtual buffer will be described later. The target code amount calculation unit 503 calculates target code amounts of a picture to be encoded based on amounts of generated code in the encoding result of the previous picture and on information of the buffer position of the virtual buffer. In the case of the top picture, it determines a default target code amount corresponding to the image quality mode from the image quality mode reception unit 401. The encoding control parameter notification unit 404 notifies the RAW compression unit 113 of the quantization parameter, the target code amounts, and the signal indicating whether the quantization control unit 304 is to be enabled or disabled.

Figure 6:
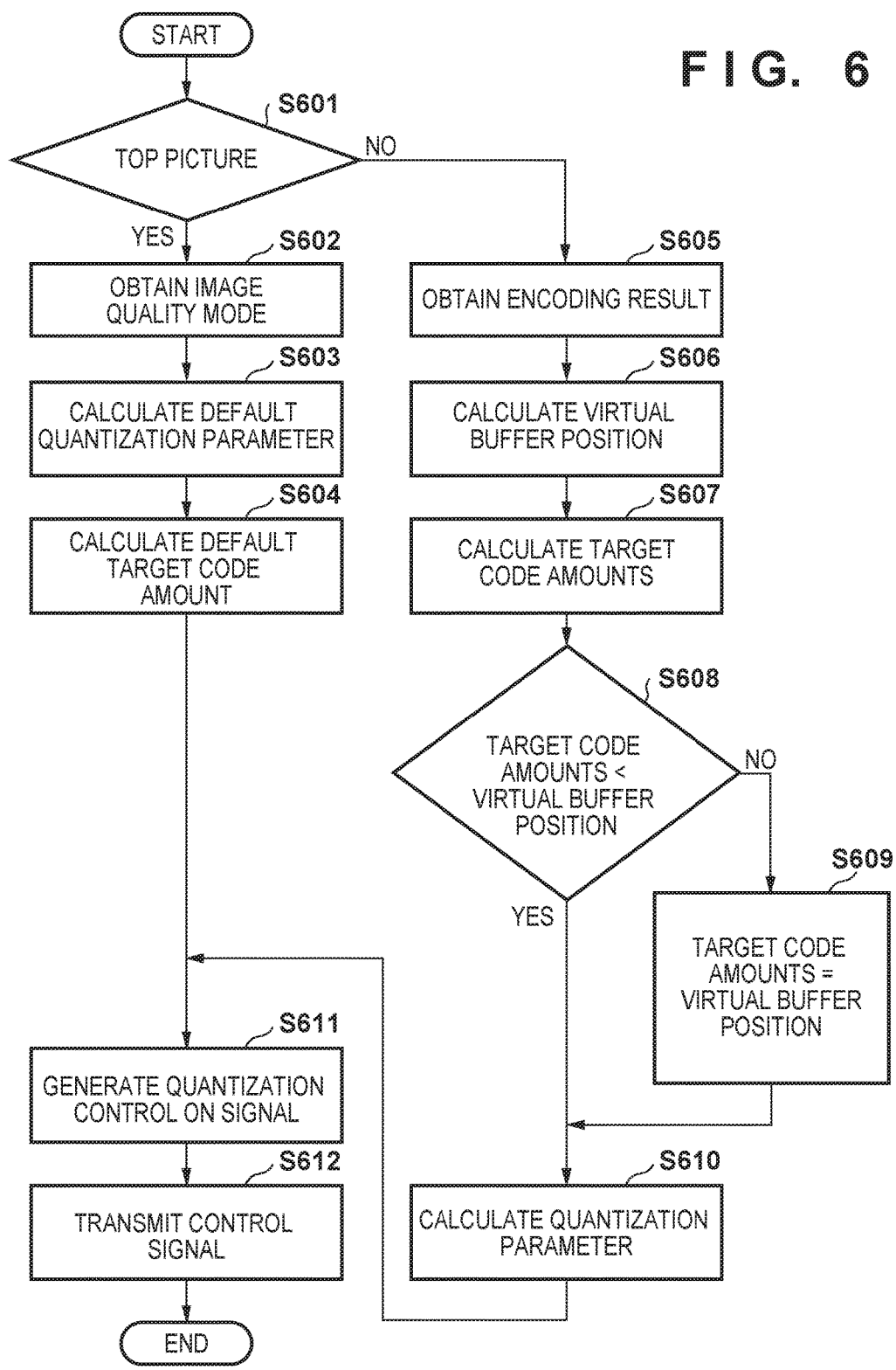
FIG. 6 is a flowchart showing an example of processing executed by the encoding control unit 171 during the "moving images" mode according to the embodiment of the invention.

FIG. 6 is a flowchart of processing of the encoding control unit 171 during the "moving images" mode. In step S601, the control unit 161 determines whether a picture to be encoded is the top picture. The processing proceeds to step S602 if the picture to be encoded is the top picture, and proceeds to step S605 if the picture to be encoded is one of the subsequent pictures.

In step S602, the image quality mode reception unit 401 receives information that designates an image quality mode from the control unit 161. The image quality mode reception unit 401 notifies the quantization parameter determination unit 402 and the target code amount calculation unit 503 of the received information of the image quality mode. In the next step S603, the quantization parameter determination unit 402 determines a default quantization parameter corresponding to the image quality mode from the image quality mode reception unit 401. In the next step S604, the target code amount calculation unit 503 determines a default target code amount corresponding to the image quality mode from the image quality mode reception unit 401. Thereafter, the processing proceeds to step S611.

In step S605, the encoding result reception unit 501 obtains an encoding result of a previous picture from the RAW compression unit 113. The encoding result reception unit 501 notifies the virtual buffer calculation unit 502 of the obtained encoding result. In the next step S606, the virtual buffer calculation unit 502 calculates a virtual buffer position based on amounts of generated code in the encoding result. In the next step S607, the target code amount calculation unit 503 calculates target code amounts of the picture to be encoded based on the amounts of generated code in the encoding result. In step S608, the target code amount calculation unit 503 determines whether the calculated target code amounts of the picture to be encoded are smaller than a data amount corresponding to the virtual buffer position. The processing proceeds to step S610 if the target code amounts are smaller than the data amount corresponding to the virtual buffer position, and proceeds to step S609 if the target code amounts are equal to or larger than the data amount corresponding to the virtual buffer position. In step S609, the target code amount calculation unit 503 sets the target code amounts to be equal to the data amount corresponding to the virtual buffer position. As a result, a buffer underflow can be avoided when RAW image data is decompressed. The specifics of this process will be described later with reference to FIG. 8C.

In the next step S610, the quantization parameter determination unit 402 calculates a quantization parameter. Here, for example, an average value of quantization parameters that were used in the encoding of the previous picture can be obtained from the encoding result and set as the quantization parameter. In step S611, the quantization control ON/OFF determination unit 403 generates a quantization control ON signal that enables the quantization control unit 304. In step S612, the encoding control parameter notification unit 404 outputs a control signal to the RAW compression unit 113. This control signal contains the determined quantization parameter, the target code amounts, and the quantization control ON signal.

Figure 7A:
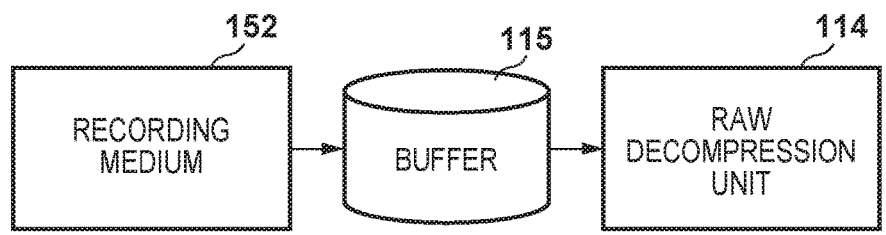
FIG. 7A is a diagram for describing a configuration related to a buffer during the "moving images" mode according to the embodiment of the invention.
Figure 7B:
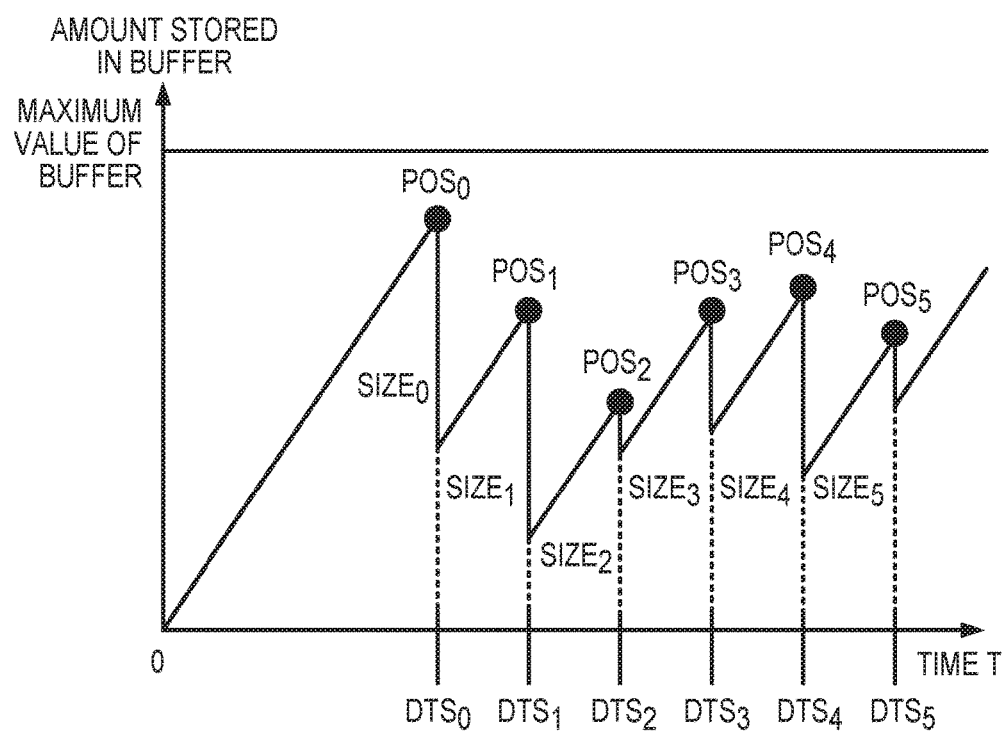
FIG. 7B is a conceptual diagram showing a virtual buffer model in code amount control according to the embodiment of the invention.

With reference to FIGS. 7A and 7B, the following describes a method used by the virtual buffer calculation unit 502 to calculate a virtual buffer position. FIG. 7A shows a configuration related to the buffer that should be taken into consideration in the code amount control during the "moving images" mode. FIG. 7B is a diagram for describing the concept of a virtual buffer model in the code amount control during the "moving images" mode.

During the "moving images" mode, a frame rate during recording does not pose any particular problems, but a buffer overflow needs to be eliminated. Meanwhile, it is necessary to enable real-time decoding and display corresponding to a frame rate during reproduction without causing a buffer overflow during reproduction. Therefore, during the "moving images" mode, the state of the buffer 115 during reproduction should be particularly taken into consideration.

As shown in FIG. 7A, during reproduction, compressed RAW image data is input from the recording medium 152 to the buffer 115. The RAW image data input to the buffer 115 is deleted from the buffer 115 as soon as it is output to the RAW decompression unit 114. As the code amount control is performed during recording, the code amount control cannot be performed when the RAW image data is written from the recording medium 152 to the buffer 115. In view of this, in the embodiment, the state of the buffer 115 during reproduction is virtually emulated as shown in FIG. 7B, and the code amount control is performed during recording so that no problem arises during reproduction.

In FIG. 7B, a vertical axis represents an amount stored in the buffer when the RAW image data is read out from the recording medium 152 to the buffer 115, and a horizontal axis represents time. DTS indicated on the time axis denotes the decoding time of each frame. At this timing, RAW image data to be decompressed is output from the virtual buffer to the RAW decompression unit 114. SIZE denotes a code amount of each frame. At each decoding time, the corresponding SIZE, or code amount of a frame to be decompressed, is subtracted from the virtual buffer. Then, until the next decoding time, RAW image data to be decompressed next is input.

POS denotes an amount stored in the virtual buffer immediately before RAW image data is read out from the virtual buffer at each decoding time. Here, the maximum value of the virtual buffer corresponds to the maximum value of the buffer 115, and a buffer overflow does not occur as long as POS does not exceed the maximum value of the buffers. When the buffer 115 is used during reproduction, compressed RAW image data is input from the recording medium 152 to the buffer 115 at a certain bitrate (data transfer speed). In the embodiment, this bitrate is expressed as Bitrate (bit/s). Here, the remaining amount POS stored in the virtual buffer can be calculated in accordance with the following Expression 1.

<When n==0>

$$POS_0 = Bitrate \times DTS_0$$

<When n!=0>

$$POS_n = POS_{n-1} - SIZE_{n-1} + Bitrate \times (DTS_n - DTS_{n-1}) \quad \text{Expression 1}$$

Expression 1 can be modified as follows.

$$POS_n = Bitrate \times DTS_n - \{Size_0 + Size_1 + \ldots + Size_{n-1}\} \quad \text{Expression 1'}$$

As indicated by Expression 1', a value of a remaining amount $POS_n$ stored in the virtual buffer is specified as a result of subtracting a total code amount of encoded data of RAW images that were encoded before a RAW image to be encoded ($Size_0 + Size_1 + \ldots + Size_{n-1}$) from a total virtual transfer amount of encoded data (Bitrate×$DTS_n$) based on a continuous period ($DTS_n$) in which RAW image data composing the moving images is read out from the recording medium 152 to the buffer 115 and on the data transfer speed (bitrate) from the recording medium 152 to the buffer 115.

At this time, if $POS_n$ exceeds the maximum value of the virtual buffer, a buffer overflow occurs, that is to say, data in the buffer is overwritten during reproduction, and decoding cannot be performed properly. In this case, for example, $SIZE_{n-1}$ can be increased by adding stuffing data to data to be written to the buffer; as a result, the position of $POS_n$ can be lowered, and the buffer overflow can be avoided. This measure to avoid the overflow can be taken during decoding by adjusting $SIZE_n$. Although the foregoing description has been given on the premise of buffer control based on CBR (constant bitrate) that constantly transfers data, VBR (variable bitrate) that suspends data transfer when $POS_n$ exceeds the maximum value of the buffer may be used.

On the other hand, when $POS_n - SIZE_n$ yields a negative value, a buffer underflow occurs, that is to say, data is not supplied by the time for starting decoding of a corresponding picture during reproduction, and decoding cannot be performed properly. In view of this, the encoding control unit 171 performs the code amount control during recording so that the virtual buffer does not crash, thereby guaranteeing real-time decoding and display without causing the occurrence of the underflow during reproduction. This process is executed in steps S607 to S609 of FIG. 6.

Figure 8A:
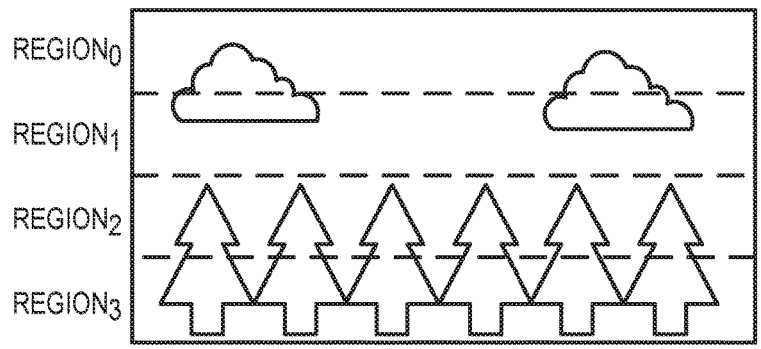
FIG. 8A shows an example of an image to be encoded according to the embodiment of the invention.
Figure 8B:
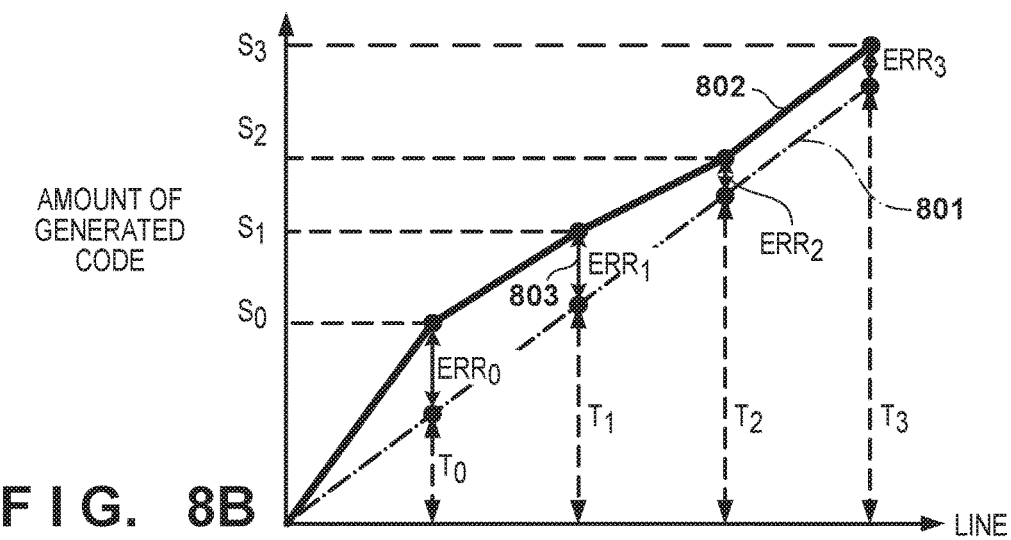
FIGS. 8B and 8C show a relationship between target code amounts and amounts of generated code within a screen according to the embodiment of the invention.

A description is now given of the quantization control performed by the quantization control unit 304 of the RAW compression unit 113. The quantization control unit 304 uses different types of quantization control for the top picture and the second and subsequent pictures. First, the quantization control for the top picture will be described using FIGS. 8A and 8B. FIG. 8A shows an example of an image to be encoded in the embodiment. FIG. 8B shows an exemplary relationship between target code amounts and amounts of generated code within one picture.

In FIG. 8A, a RAW image to be encoded is divided into four regions consisting of $region_0$ to $region_3$. In this case, the quantization control unit 304 determines quantization parameters for the respective regions, and notifies the quantization unit 302 of the quantization parameters. Note that the foregoing method of dividing the image into the regions, as well as the number of divided regions, is merely an example, and the image may be divided into more regions.

Next, a method used by the quantization control unit 304 to determine the quantization parameters for the respective regions will be described using FIG. 8B. A dot-and-dash line 801 indicates a total target code amount in each region, and presents a result of calculating values of the total target code amounts in the four regions consisting of the top region $T_0$ to the region $T_3$. These target code amounts are calculated by the target code amount calculation unit 503 in the process of step S604. As shown in FIG. 8B, in the first picture, the target code amounts allocated to the regions are even. The target code amounts allocated to the regions are even in the top picture because the characteristics of the image are unknown and it is difficult to weight the code amount in each region.

A solid line 802 indicates a total amount of generated code in each region. For example, the total amount of generated code in the top region is $S_0$. The total amount of generated code $S_1$ in the second region that succeeds the top region is a sum of $S_0$ and the amount of generated code in the second region $(S_1-S_0)$. A similar calculation is performed with respect to the third and subsequent regions. Each arrow 803 indicates a code amount difference ERR between the total target code amount 801 and the total amount of generated code 802. It is apparent from FIG. 8B that the amount of generated code $S_0$ exceeds the target code amount $T_0$ in the top region. In this case, in the second region, control is performed by determining the quantization parameter using the following equation, so as to suppress the amount of generated code in the second region and hence bring $T_1$ and $S_1$ close to each other by increasing the number of quantization steps used as the quantization parameter compared with the top region.

$$Q_n = Q_0 + ERR_{n-1} \times R \qquad \text{Expression 2}$$

$Q_n$: the quantization parameter (the number of quantization steps) in the region N $ERR_n$: the total code amount difference up to the region N R: control sensitivity According to Expression 2, the quantization parameter set in the $region_0$ is used as a reference, and the code amount difference between the total target code amount 801 and the total amount of generated code 802 is reduced by adjusting this quantization parameter in accordance with the magnitude of ERR. A parameter that was determined by the quantization parameter determination unit 402 and notified by the encoding control unit 171 is used as the quantization parameter set in the $region_0$. Expression 2 is similar to a typical expression used in an image encoding method presented by MPEG-2 Test Model 5, and a quantization code is obtained by performing feedback control so as to reduce the difference between the target code amount and the actual amount of generated code in a picture.

Figure 8C:
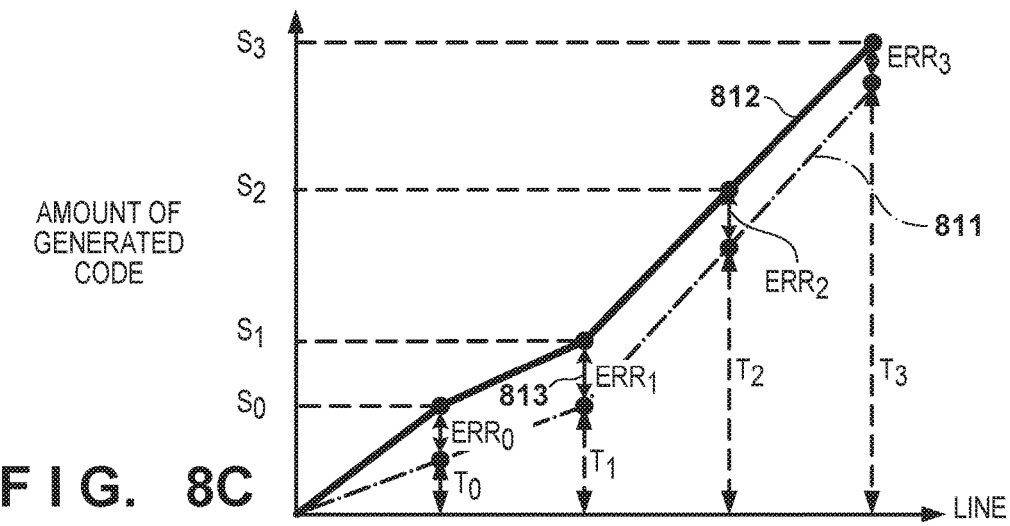

Next, the quantization control for the second and subsequent pictures will be described using FIGS. 8A and 8C. FIG. 8C shows an exemplary relationship between target code amounts and amounts of generated code within one picture (the second or any subsequent picture). Using FIG. 8C, the following describes a method used by the quantization control unit 304 to determine the quantization parameters for the respective regions. The following description focuses on the differences from the control for the first picture, or the top picture, among a sequence of pictures composing the moving images.

A dot-and-dash line 811 indicates a total target code amount in each region, and presents a result of calculating values of the total target code amounts in the four regions consisting of the top region $T_0$ to the region $T_3$ in order. These target code amounts are calculated by the target code amount calculation unit 503 in the processes of steps S607 to S609. As shown in FIG. 8C, the target code amount in each region is weighted. In the second and subsequent pictures, the target code amount in each region can be weighted because the characteristics of the images can be grasped through feedback of the encoding result of a previous picture.

Referring to the example of FIG. 8A, by way of weighting, the target code amount can be reduced in each of the $region_0$ and the $region_1$ that are mainly occupied by the sky with less high-frequency components, whereas the target code amount can be increased in each of the $region_2$ and the $region_3$ that are mainly occupied by trees with many high-frequency components. Similarly to FIG. 8B, a solid line 812 indicates a total amount of generated code in each region, and each arrow 813 indicates a code amount difference ERR between the total target code amount and the total amount of generated code. In the second and subsequent pictures also, the quantization steps in each region can be determined in accordance with Expression 2 as in the first picture.

The specifics of the process of step S609 in FIG. 6 will now be described with reference to FIG. 8C. In the embodiment, the target code amounts are set for the respective regions as shown in FIG. 8C. In view of this, in correcting the target code amounts in step S609, a code amount based on the virtual buffer position is split in accordance with a ratio of the target code amounts in the regions calculated in step S607, and the split code amounts are allocated to the regions. For example, when the ratio of the target code amounts that are set for the $region_0$ to the $region_3$ respectively is 1:0.9:1.2:1.3, the code amount (Cv) based on the virtual buffer position is split based on this ratio. Therefore, $Cv \times 1/(1+0.9+1.2+1.3)$ is allocated to the $region_0$. Note that rather than using the ratio, a result of equally dividing a difference between the calculated target code amount of the next picture and the virtual buffer position may be subtracted from the calculated target code amount in each region.

<Operations During "Continuous Shooting of Still Images" Mode>

Figure 9:
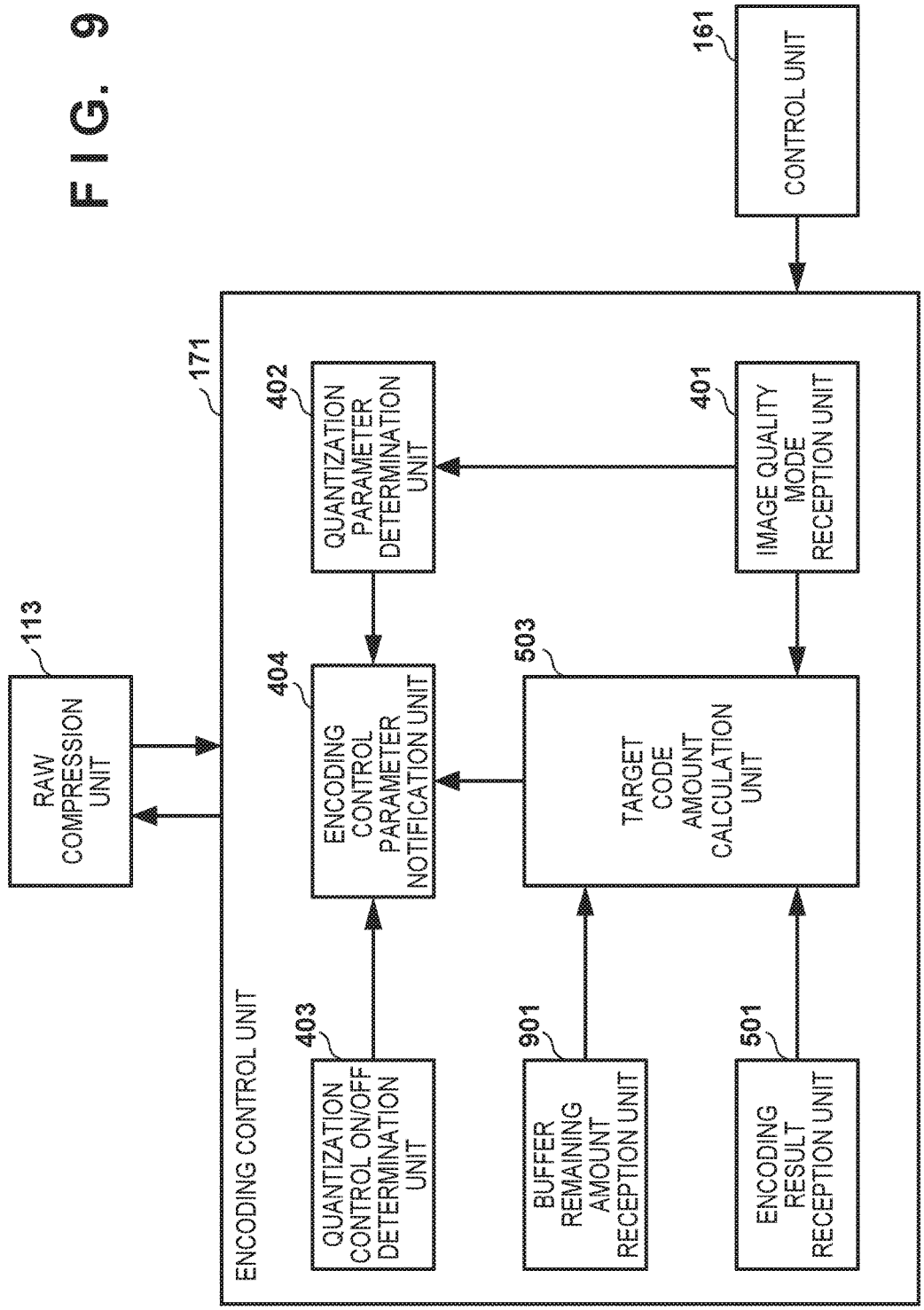
FIG. 9 is a block diagram showing an exemplary configuration of the encoding control unit 171 during a "continuous shooting of still images" mode according to the embodiment of the invention.

A description is now given of the operations of the image capturing apparatus 100 during the "continuous shooting of still images" mode. FIG. 9 is a block diagram showing an exemplary functional configuration of the encoding control unit 171 during the "continuous shooting of still images" mode. During the "continuous shooting of RAW still images" mode, a buffer remaining amount reception unit 901 is used instead of the virtual buffer calculation unit 502 used during the "moving images" mode shown in FIG. 5. The function blocks shown in FIGS. 4A and 5 also perform operations corresponding to the "continuous shooting of still images" mode. Note that the function blocks that are the same as in FIGS. 4A and 5 are given the same reference signs.

The following describes the differences from the operations performed by the encoding control unit 171 during the "moving images" mode. The buffer remaining amount reception unit 901 receives an amount of free space remaining in the buffer 115 at the time of encoding of a picture to be encoded. The target code amount calculation unit 503 calculates target code amounts of the picture to be encoded using amounts of generated code in the encoding result of a previous picture and information of the amount of free space remaining in the buffer. In the case of the top picture, a default target code amount corresponding to an image quality mode is determined. As the operations of other function blocks are similar to those performed during the "moving images" mode, a description thereof will be omitted.

Figure 10:
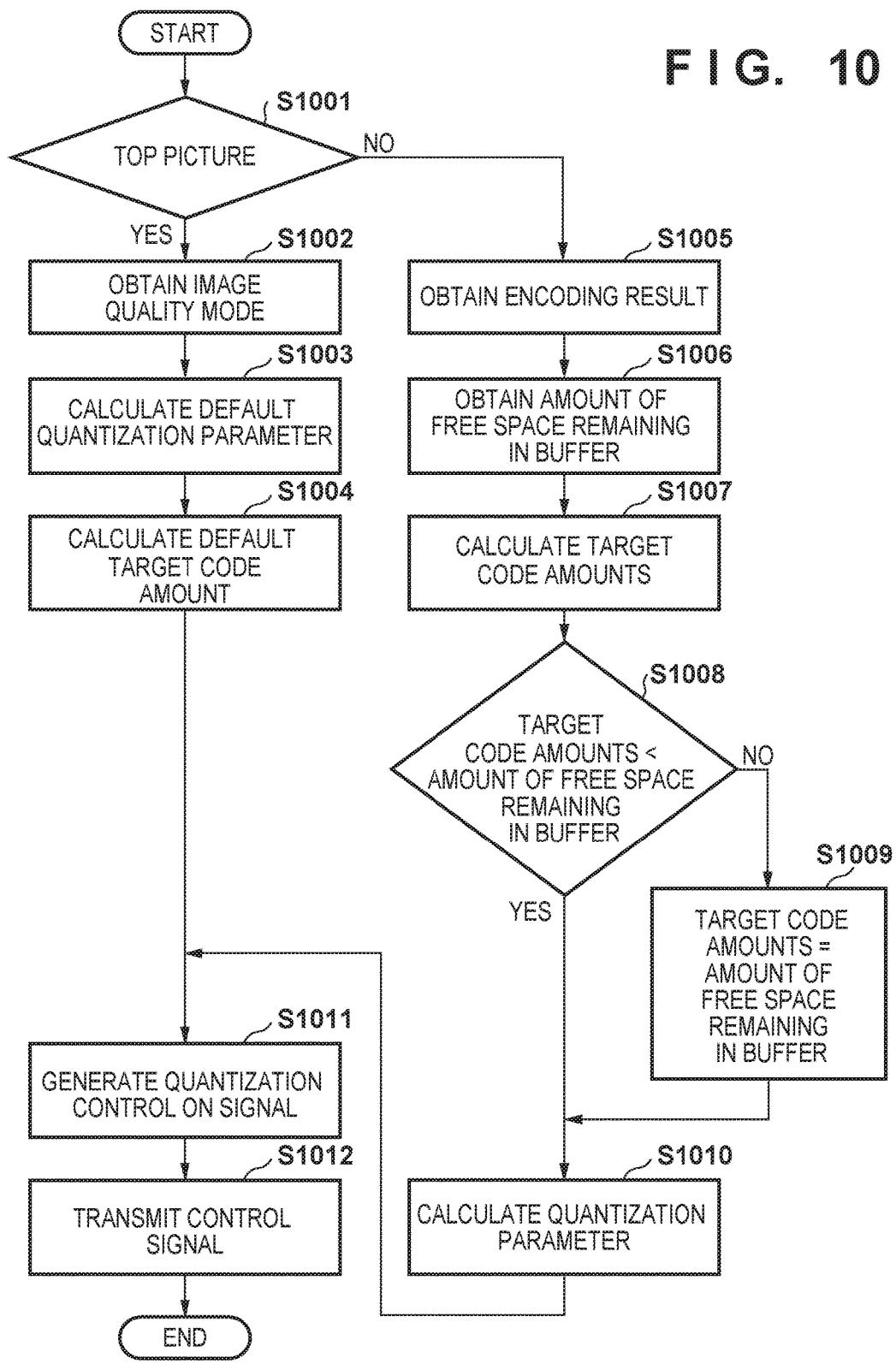
FIG. 10 is a flowchart showing an example of processing executed by the encoding control unit 171 during the "continuous shooting of still images" mode according to the embodiment of the invention.

FIG. 10 is a flowchart of processing of the encoding control unit 171 during the "continuous shooting of still images" mode. In step S1001, the control unit 161 determines whether a picture to be encoded is the top picture. The processing proceeds to step S1002 if the picture to be encoded is the top picture, and proceeds to step S1005 if the picture to be encoded is one of the subsequent pictures.

In step S1002, the image quality mode reception unit 401 receives information that designates an image quality mode from the control unit 161. The image quality mode reception unit 401 notifies the quantization parameter determination unit 402 and the target code amount calculation unit 503 of the received information of the image quality mode. In the next step S1003, the quantization parameter determination unit 402 determines a default quantization parameter corresponding to the image quality mode from the image quality mode reception unit 401. In the next step S1004, the target code amount calculation unit 503 determines a default target code amount corresponding to the image quality mode from the image quality mode reception unit 401. Thereafter, the processing proceeds to step S1011.

In step S1004, as has been described with reference to FIGS. 8A and 8B, the picture is divided into a plurality of regions, and target code amounts are determined for the respective regions. Especially in step S1004, as the target picture is the top picture in continuous shooting of still images, the same value can be determined as the target code amount in each region.

In step S1005, the encoding result reception unit 501 obtains an encoding result of a previous picture from the RAW compression unit 113. The encoding result reception unit 501 notifies the target code amount calculation unit 503 of the obtained encoding result. In the next step S1006, the buffer remaining amount reception unit 901 receives an amount of free space remaining in the buffer 115. The buffer remaining amount reception unit 901 notifies the target code amount calculation unit 503 of the received amount of free space remaining in the buffer. In the next step S1007, the target code amount calculation unit 503 calculates target code amounts of the picture to be encoded based on amounts of generated code in the encoding result of a previous picture. Here, as has been described with reference to FIGS. 8A and 8C, the picture is divided into a plurality of regions, and target code amounts are calculated for the respective regions. Especially in step S1007, as the target picture is the second or any subsequent picture, the target code amounts are calculated based on the amounts of generated code in the corresponding regions in the previous picture that has already been encoded.

In step S1008, the target code amount calculation unit 503 determines whether the calculated target code amounts are smaller than the amount of free space remaining in the buffer 115. The processing proceeds to step S1010 if the target code amounts are smaller than the amount of free space remaining in the buffer, and proceeds to step S1009 if the target code amounts are equal to or larger than the amount of free space remaining in the buffer. In step S1009, the target code amount calculation unit 503 sets the target code amounts to be equal to the amount of free space remaining in the buffer. The specifics of this process will be described later with reference to FIGS. 8C and 11C.

In the next step S1010, the quantization parameter determination unit 402 calculates a quantization parameter. Here, for example, an average value of quantization parameters that were used in the encoding of the previous picture can be obtained from the encoding result and set as the quantization parameter. The quantization parameter obtained here is used as a value of $Q_0$ when the quantization control unit 304 determines quantization parameters based on Expression 2. In step S1011, the quantization control ON/OFF determination unit 403 generates a quantization control ON signal that enables the quantization control unit 304. In step S1012, the encoding control parameter notification unit 404 outputs a control signal to the RAW compression unit 113. This control signal contains the determined quantization parameter, the target code amounts, and the quantization control ON signal.

Figure 11A:
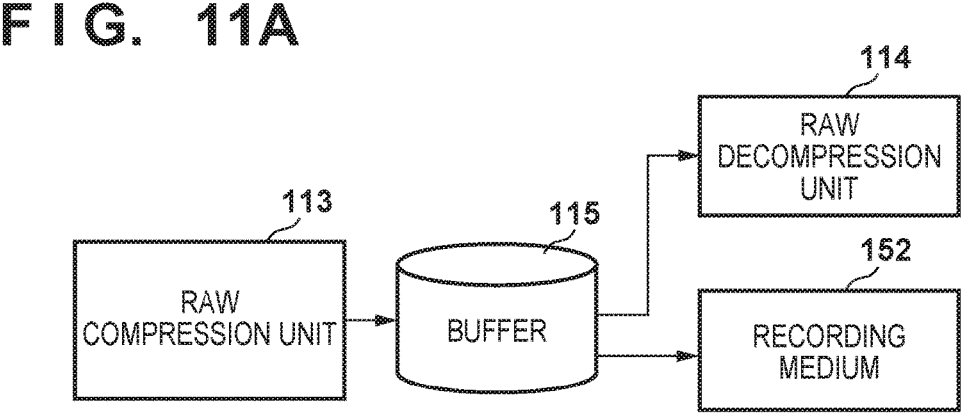
FIG. 11A is a diagram for describing a configuration related to the buffer during the "continuous shooting of still images" mode according to the embodiment of the invention.
Figure 11B:
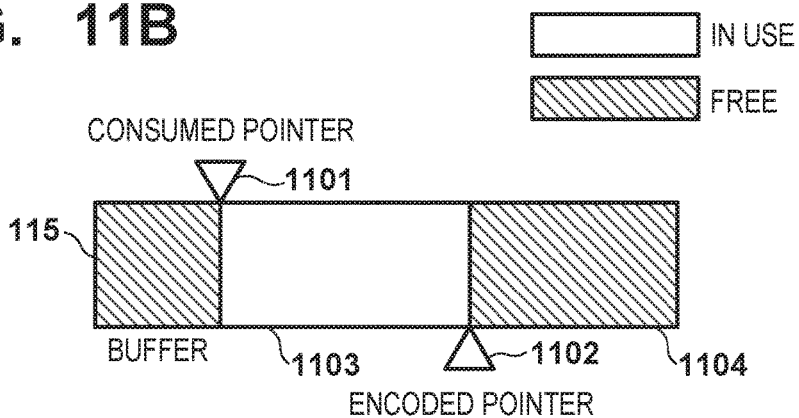
FIG. 11B is a conceptual diagram showing the buffer according to the embodiment of the invention.
Figure 11C:
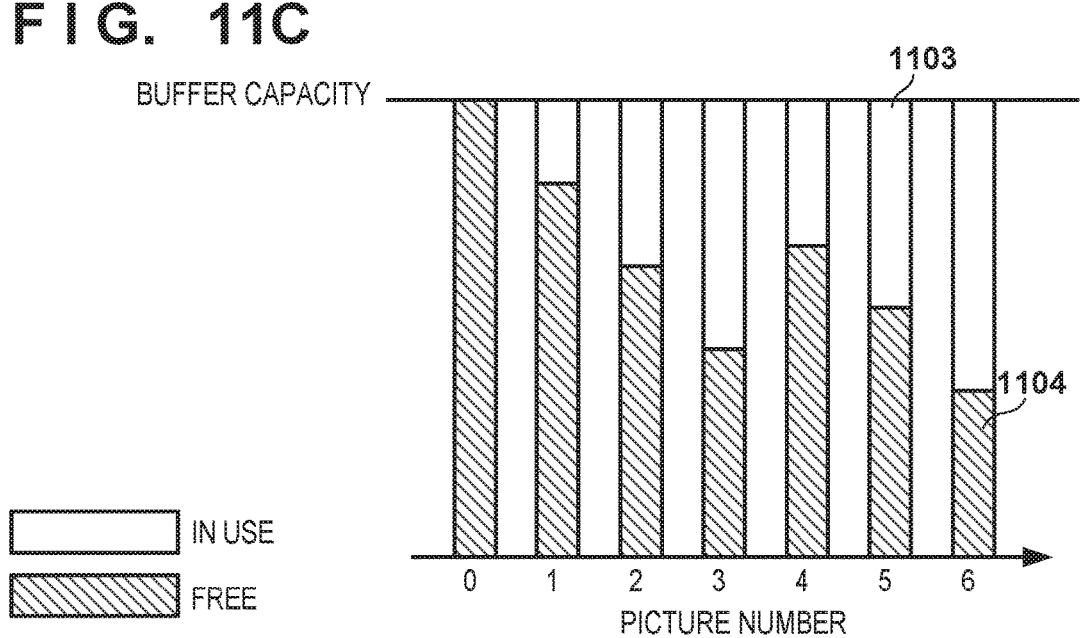
FIG. 11C is a conceptual diagram showing the state of the buffer according to the embodiment of the invention.

The following describes the concept of the amount of free space remaining in the buffer with reference to FIGS. 11A to 11C. FIG. 11A shows a configuration related to the buffer 115 that should be taken into consideration in the code amount control during the "continuous shooting of still images" mode. FIG. 11B is a diagram for describing the concept of the buffer during the "continuous shooting of still images" mode. FIG. 11C is a conceptual diagram showing the state of the buffer during the "continuous shooting of still images" mode.

During the "continuous shooting of still images" mode, it is necessary to prevent a buffer overflow when RAW image data is encoded. During reproduction, as there is no notion of a frame rate unlike the case of moving images, it is sufficient to decode and display images in the order of decompression; therefore, the state of the buffer need not be taken into consideration during reproduction. Thus, during the "continuous shooting of still images" mode, the state of the buffer 115 at the time of encoding should be particularly taken into consideration. As shown in FIG. 11A, a compressed RAW file is input from the RAW compression unit 113, and data of the file is output to the RAW decompression unit 114 and the recording medium 152. In the code amount control during the "continuous shooting of still images" mode, there is no need to emulate a virtual reproduction buffer unlike the case of moving images.

With reference to FIG. 11B, the following describes the idea behind the amount of free space remaining in the buffer during the "continuous shooting of still images" mode. A consumed pointer 1101 indicates a buffer position in the buffer 115 at which data has already been output to the RAW decompression unit 114 and the recording medium 152. An encoded pointer 1102 indicates a buffer position in the buffer 115 at which RAW image data (encoded data) compressed by the RAW compression unit 113 is stored. An area 1103 represents a data area that is currently used in the buffer 115, and contains data to be output to the RAW decompression unit 114 and the recording medium 152. A hatched area 1104 represents free space in the buffer 115.

With reference to FIG. 11C, the following describes the state of the buffer during the "continuous shooting of still images" mode. In a graph of FIG. 11C, a vertical axis represents a total capacity of the buffer 115, and a horizontal axis represents picture numbers. In the graph, the hatched area 1104 represents free space, and the area 1103 represents a data area that is currently used, that is to say, a data area in which data is already stored. FIG. 11C shows the state of the buffer 115 at the start of encoding of each picture in the form of a ratio between a data length of the data area that is currently used in the buffer 115 and a data length of the free space. Pictures are written to and read out from the buffer 115 on a picture-by-picture basis; therefore, when one picture has been encoded, the free space is reduced by a corresponding amount, and when RAW image data of one picture has been written to the recording medium 152, the free space is increased. In the code amount control during the "continuous shooting of still images" mode, target code amounts used in the encoding processing executed by the RAW compression unit 113 are set to be equal to or smaller than the data length of the free space 1104 so that the data area 1103 currently used is not overwritten using newly encoded RAW image data.

The specifics of the process of step S1009 in FIG. 10 will now be described with reference to FIGS. 8C and 11C. In the embodiment, the target code amounts are set for the respective regions as shown in FIG. 8C. In view of this, in correcting the target code amounts in step S1009, a code amount equivalent to an amount of free space remaining in the buffer for the picture number of a picture to be encoded in FIG. 11C is split in accordance with a ratio of the target code amounts in the regions calculated in step S1007, and the split code amounts are allocated to the regions. For example, when the ratio of the target code amounts that are set for the region$_0$ to the region$_3$ respectively is 1:0.8:1.1:1.5, the code amount (Cr) based on the amount of free space remaining in the buffer is split based on this ratio, and the split code amounts are allocated. Therefore, Cr×1/(1+0.8+1.1+1.5) is allocated to the region$_0$. Note that rather than using the ratio, a result of equally dividing a difference between the calculated target code amount of the next picture and the virtual buffer position may be subtracted from the calculated target code amount in each region.

During the "continuous shooting of still images" mode, the quantization control can be basically performed by changing a quantization parameter within a screen, similarly to the quantization control during the "moving images" mode described with reference to FIGS. 8A to 8C. In the "continuous shooting of still images" mode also, with respect to RAW images generated through continuous shooting and recording, the quantization control unit 304 uses different types of quantization control for a RAW image of the top picture and RAW images of the second and subsequent pictures.

<Determining Current Operation Mode>

Figure 12:
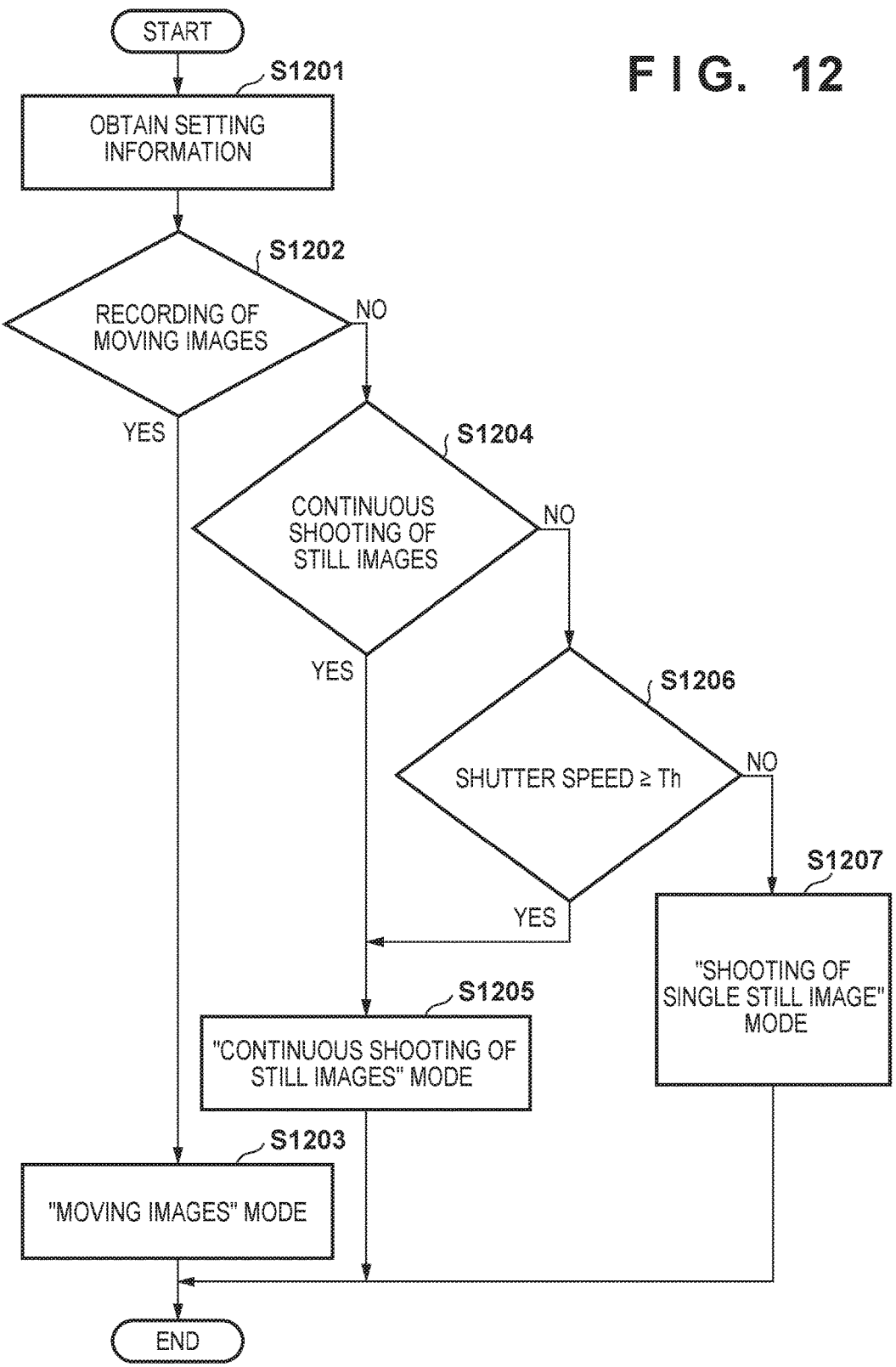
FIG. 12 is a flowchart showing an example of operation mode determination processing according to the embodiment of the invention.

With reference to FIG. 12, the following describes a method used by the control unit 161 to determine a current operation mode. FIG. 12 is a flowchart showing an example of operation mode determination processing executed by the control unit 161 according to the embodiment of the invention.

In step S1201, the control unit 161 obtains shooting setting information from the operation unit 162. In the next step S1202, the control unit 161 determines whether the user has issued an instruction for recording moving images based on the substance of the shooting setting information from the operation unit 162. The processing proceeds to step S1203 if it is determined by the control unit 161 that the instruction for recording moving images has been issued, and proceeds to step S1204 if it is determined that the instruction for recording moving images has not been issued. In step S1203, the control unit 161 determines the "moving images" mode as the current operation mode. In step S1204, whether the user has issued an instruction for continuously shooting still images is determined based on the substance of the shooting setting information. The processing proceeds to step S1205 if it is determined by the control unit 161 that the instruction for continuously shooting still images has been issued, and proceeds to step S1206 if it is determined that the instruction for continuously shooting still images has not been issued. In step S1206, the control unit 161 determines whether a shutter speed is equal to or higher than a predetermined threshold Th. If the control unit 161 determines that the shutter speed is equal to or higher than the predetermined threshold Th, the processing proceeds to step S1205. In step S1205, the control unit 161 determines the "continuous shooting of still images" mode as the current operation mode. If the control unit 161 determines that the shutter speed is not equal to or higher than the predetermined threshold Th, the processing proceeds to step S1207. In step S1207, the control unit 161 determines the "shooting of single still image" mode as the current operation mode.

As described above, the control unit 161 determines the "moving images" mode as the current operation mode when moving images are to be recorded in accordance with the shooting setting information designated by the user via the operation unit 162. When continuous shooting of still images has been designated, continuous shooting and recording are presumed to be performed, and thus the "continuous shooting of still images" mode is determined as the current operation mode. Also, when still images are to be recorded at a high shutter speed, continuous shooting and recording can be performed, and thus the "continuous shooting of still images" mode is determined as the current operation mode. In other cases, as the RAW compression unit 113 generates a compressed RAW file at low speed, the buffer 115 does not undergo a buffer overflow even without performing the code amount control; thus, the "shooting of single still image" mode is determined as the current operation mode. In the foregoing manner, one of the operation modes, namely the "moving images" mode, the "shooting of single still image" mode, and the "continuous shooting of still images" mode can be appropriately selected in accordance with a user operation.

According to the foregoing embodiment, in the "shooting of single still image" mode, the code amount control and the quantization control are performed with an emphasis on image quality. In the "moving images" mode, the code amount control and the quantization control are performed with an emphasis on controllability of a code amount. More specifically, in the encoding control during the "moving images" mode, a buffer overflow during real-time reproduction can be prevented by performing encoding in consideration of the state of the buffer during real-time reproduction. Furthermore, in the "continuous shooting of still images" mode, the state of the buffer during encoding is taken into consideration but the state of the buffer during reproduction is not taken into consideration in performing the code amount control and the quantization control; thus, restrictions are eased compared with the "moving images" mode, and control can be performed with more emphasis on image quality. As a result, in RAW compression processing and control therefor, effective code amount control and quantization control can be performed in each of the "moving images" mode, the "shooting of single still image" mode, and the "continuous shooting of still images" mode, and high image quality and real-time reproduction of moving images can be guaranteed without data corruption during recording.

Other Embodiments

Embodiments of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-221833, filed Nov. 14, 2016, which is hereby incorporated by reference herein in its entirety.

What is claimed is:

1. An image capturing apparatus comprising:
an image capturing unit configured to generate a RAW image by shooting a subject;
one or more processors; and
one or more memories including instructions stored thereon that, when executed by the one or more processors, cause the image capturing apparatus to:
perform quantization of the RAW image;
generate encoded data by encoding the quantized RAW image;
record the encoded data in a recording medium as a RAW file; and
set quantization parameters respectively for a plurality of regions of the RAW image to perform the quantization in a case where a plurality of RAW images are continuously shot and recorded as the RAW file, and to perform the quantization without changing the quantization parameters respectively for the plurality of regions of the RAW image in a case where a single RAW image is shot and recorded as the RAW file.

2. The image capturing apparatus according to claim 1, wherein
the plurality of regions are obtained by dividing a RAW image to be encoded.

3. The image capturing apparatus according to claim 2, wherein
when the quantization parameters are set for the plurality of regions of the RAW image, the quantization parameter is determined based on a difference between a target code amount for the encoding and an amount of generated code in the encoding result for each region of the RAW image to be encoded.

4. The image capturing apparatus according to claim 3, wherein
the quantization parameter is set at a value obtained by correcting a first quantization parameter based on the difference, wherein the first quantization parameter being set for a region that is encoded first among the plurality of regions.

5. The image capturing apparatus according to claim 4, wherein
the quantization parameter of a region to be encoded among the plurality of regions is set at a value obtained by correcting the first quantization parameter based on a difference between a sum of the target code amounts and a sum of the amounts of generated code in regions that have been encoded before the region to be encoded among the plurality of regions.

6. The image capturing apparatus according to claim 4, wherein
for a top RAW image among the plurality of RAW images, a quantization parameter corresponding to a designated image quality mode is determined as the first quantization parameter, and
for any of RAW images that succeed the top RAW image, the first quantization parameter is determined based on the quantization parameters set for the plurality of regions in a RAW image that has been encoded before the RAW image to be encoded.

7. The image capturing apparatus according to claim 3, wherein
when the RAW image to be encoded is a top RAW image among the plurality of RAW images, the same target code amount is set for the plurality of regions.

8. The image capturing apparatus according to claim 3, further comprising
a storage unit configured to temporarily store the encoded data,
wherein, when the plurality of RAW images are continuously generated through continuous shooting of still images, the target code amounts are set so that a sum of the target code amounts for the plurality of regions does not exceed a size of free space in the storage unit.

9. The image capturing apparatus according to claim 8, wherein
the target code amounts are calculated for the respective regions based on the amounts of generated code in the encoding results of each of the plurality of regions in another RAW image that has been encoded before the RAW image to be encoded in the continuous shooting of still images, and
when a sum of the target code amounts calculated for the respective regions exceeds the size of the free space, target code amounts obtained by splitting a code amount based on the free space in accordance with a ratio of the target code amounts calculated for the respective regions are respectively allocated to the plurality of regions.

10. The image capturing apparatus according to claim 3, further comprising:
a storage unit configured to temporarily store the encoded data; and
wherein the instructions, when executed by the one or more processors, further cause the image capturing apparatus to decode the encoded data stored in the storage unit, and
wherein when the plurality of RAW images are continuously generated through shooting of moving images, values of the target code amounts are set so that a sum of the target code amounts for the plurality of regions does not exceed a virtual storage amount of the storage unit that is presumed when the encoded data recorded in the recording medium is read out to the storage unit, decoded, and deleted from the storage unit.

11. The image capturing apparatus according to claim 10, wherein
a value of the virtual storage amount is specified by subtracting a total code amount of encoded data of RAW images that have been encoded before the RAW image to be encoded from a virtual total transfer amount of encoded data based on a continuous period in which encoded data composing the moving images is read out from the recording medium to the storage unit and on a speed of data transfer from the recording medium to the storage unit.

12. The image capturing apparatus according to claim 10, wherein
the target code amounts are calculated for the respective regions based on the amounts of generated code in encoding results of the plurality of regions in another RAW image that has been encoded before the RAW image to be encoded in the shooting of the moving images, and when a sum of the target code amounts calculated for the respective regions exceeds the virtual storage amount, target code amounts obtained by splitting a code amount based on the virtual storage amount in accordance with a ratio of the target code amounts calculated for the respective regions are respectively allocated to the plurality of regions.

13. An image processing method comprising:
quantizing a RAW image generated by an image capturing unit;
generating encoded data by encoding the quantized RAW image;
recording the encoded data in a recording medium as a RAW file; and
controlling the quantizing by setting quantization parameters respectively for a plurality of regions of the RAW image in a case where a plurality of RAW images are continuously shot and recorded as the RAW file, and the quantizing without changing the quantization parameters respectively for the plurality of regions of the RAW image in a case where a single RAW image is shot and recorded as the RAW file.

14. A non-transitory computer-readable storage medium storing a program that, when executed by a processor of an image capturing apparatus, causes the processor to perform an image processing method, the method comprising:
quantizing a RAW image generated by an image capturing unit;
generating encoded data by encoding the quantized RAW image;
recording the encoded data in a recording medium as a RAW file; and
controlling the quantizing by setting quantization parameters respectively for a plurality of regions of the RAW image in a case where a plurality of RAW images are continuously shot and recorded as the RAW file, and the quantizing without changing the quantization parameters respectively for the plurality of regions of the RAW image in a case where a single RAW image is shot and recorded as the RAW file.

15. The image capturing apparatus according to claim 1, wherein the plurality of RAW images continuously shot are a plurality of RAW images obtained through continuous shooting of still images.

16. The image capturing apparatus according to claim 1, wherein the plurality of RAW images continuously shot are a plurality of RAW images obtained through shooting of moving images.

17. An image capturing apparatus comprising:
an image capturing unit configured to generate a RAW image by shooting a subject;
one or more processors; and
one or more memories including instructions stored thereon that, when executed by the one or more processors, cause the image capturing apparatus to:
perform quantization of the RAW image;
generate encoded data by encoding the quantized RAW image;
record the encoded data in a recording medium as a RAW file; and
set quantization parameters respectively for a plurality of regions of the RAW image to perform the quantization in a case where a plurality of RAW still images are continuously shot and recorded as the RAW file, and to perform the quantization without changing the quantization parameters respectively for the plurality of regions of the RAW image in a case where a single RAW still image is shot and recorded as the RAW file.

18. An image capturing apparatus comprising:
an image capturing unit configured to generate a RAW image by shooting a subject;
one or more processors; and
one or more memories including instructions stored thereon that, when executed by the one or more processors, cause the image capturing apparatus to:
perform quantization of the RAW image;
generate encoded data by encoding the quantized RAW image;
record the encoded data in a recording medium as a RAW file; and
set quantization parameters respectively for a plurality of regions of the RAW image to perform the quantization in a case where RAW moving images are captured and recorded as the RAW file, and to perform the quantization without changing the quantization parameters respectively for the plurality of regions of the RAW image in a case where a single RAW still image is captured and recorded as the RAW file.

19. The image capturing apparatus according to claim 18, wherein when the quantization parameters are respectively set for the plurality of regions of the RAW image, the quantization parameter is determined based on a difference between a target code amount for the encoding and an amount of generated code in the encoding result for each region of the RAW image to be encoded.

20. The image capturing apparatus according to claim 19, wherein the quantization parameter is set at a value obtained by correcting a first quantization parameter based on the difference, wherein the first quantization parameter being set for a region that is encoded first among the plurality of regions.

21. The image capturing apparatus according to claim 19, wherein
when the RAW image to be encoded is a top RAW image among the RAW moving images, the same target code amount is set for the plurality of regions.

* * * * *